US011307486B2

(12) United States Patent
Jung et al.

(10) Patent No.: US 11,307,486 B2
(45) Date of Patent: Apr. 19, 2022

(54) LENS DRIVING DEVICE, CAMERA MODULE, AND OPTICAL APPARATUS

(71) Applicant: LG INNOTEK CO., LTD., Seoul (KR)

(72) Inventors: Tae Jin Jung, Seoul (KR); Sang Jun Min, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 16/765,086

(22) PCT Filed: Nov. 22, 2018

(86) PCT No.: PCT/KR2018/014433
§ 371 (c)(1),
(2) Date: May 18, 2020

(87) PCT Pub. No.: WO2019/107833
PCT Pub. Date: Jun. 6, 2019

(65) Prior Publication Data
US 2020/0355985 A1    Nov. 12, 2020

(30) Foreign Application Priority Data
Nov. 30, 2017  (KR) .................. 10-2017-0162974

(51) Int. Cl.
*G03B 13/36* (2021.01)
*G03B 3/10* (2021.01)
(Continued)

(52) U.S. Cl.
CPC .............. *G03B 13/36* (2013.01); *G03B 3/10* (2013.01); *G03B 5/02* (2013.01); *G03B 17/12* (2013.01)

(58) Field of Classification Search
CPC .................................................... G03B 13/36
See application file for complete search history.

(56) References Cited

U.S. PATENT DOCUMENTS

| 2016/0048033 | A1* | 2/2016 | Kim | ..................... G02B 27/646 348/357 |
| 2017/0123182 | A1 | 5/2017 | Cho et al. | |

(Continued)

FOREIGN PATENT DOCUMENTS

| CN | 104808416 A | 7/2015 |
| CN | 105372785 A | 3/2016 |

(Continued)

OTHER PUBLICATIONS

International Search Report in International Application No. PCT/KR2018/014433, filed Nov. 22, 2018.
(Continued)

*Primary Examiner* — Clayton E. LaBalle
*Assistant Examiner* — Diana Hancock
(74) *Attorney, Agent, or Firm* — Saliwanchik, Lloyd & Eisenschenk

(57) ABSTRACT

The present embodiment relates to a lens driving device, a camera module and an optical device. The lens driving device comprising: a cover; a housing arranged inside the cover; a bobbin arranged inside the housing; a magnet arranged in the housing; a first coil arranged in the bobbin and facing the magnet; a first substrate arranged below the housing and including a second coil facing the magnet; a second substrate arranged below the first substrate; and a base arranged below the second substrate, wherein the base includes a body and a protrusion upwardly protruding from the body, the outer side of the second substrate is arranged to face the inner side of the protrusion, and the upper surface of the protrusion is in a location which is the same as or lower than that of the upper surface of the first substrate.

20 Claims, 10 Drawing Sheets

(51) Int. Cl.
*G03B 5/02* (2021.01)
*G03B 17/12* (2021.01)

(56) References Cited

U.S. PATENT DOCUMENTS

| | | | |
|---|---|---|---|
| 2017/0176768 A1 | 6/2017 | Kim | |
| 2017/0336699 A1* | 11/2017 | Hu | G02B 7/09 |
| 2018/0115715 A1* | 4/2018 | Jung | G02B 7/09 |
| 2018/0348594 A1* | 12/2018 | Shin | G02B 27/646 |
| 2019/0033554 A1* | 1/2019 | Shin | H04N 5/2257 |

FOREIGN PATENT DOCUMENTS

| | | |
|---|---|---|
| CN | 105824167 A | 8/2016 |
| KR | 10-2015-0089648 A | 8/2015 |
| KR | 10-2016-0060219 A | 5/2016 |
| KR | 10-2017-0006727 A | 1/2017 |
| KR | 10-2017-0110953 A | 10/2017 |
| WO | WO-2009/051345 A1 | 4/2009 |
| WO | WO-2017/003199 A1 | 1/2017 |

OTHER PUBLICATIONS

Office Action dated Jun. 4, 2021 in Chinese Application No. 201880077919.7.
Supplementary European Search Report dated Jul. 16, 2021 in European Application No. 18882909.7.

* cited by examiner

LENS DRIVING DEVICE, CAMERA MODULE, AND OPTICAL APPARATUS

CROSS-REFERENCE TO RELATED APPLICATIONS

This application is the U.S. national stage application of International Patent Application No. PCT/KR2018/014433, filed Nov. 22, 2018, which claims the benefit under 35 U.S.C. § 119 of Korean Application No. 10-2017-0162974, filed Nov. 30, 2017, the disclosures of each of which are incorporated herein by reference in their entirety.

TECHNICAL FIELD

The teachings in accordance with exemplary and non-limiting embodiments of this invention relate generally to a lens driving device, a camera module, and an optical device.

BACKGROUND ART

This section provides background information related to the present invention, which is not necessarily prior art.

Concomitant with generalization of wide use of various mobile terminals, and commercialization of wireless internet services, demands by consumers related to mobile terminals are also diversified to allow various types of peripheral devices to be mounted on the mobile terminals. A camera module is one of the representative items that capture a subject in a picture or a video. Recently, a camera module has emerged that is equipped with an AF (Auto Focus) function by being mounted with a lens driving device to automatically adjust a focus in response to a distance to a subject, or that is equipped with an OIS (Optical Image Stabilization) function configured to move or tilt a lens module to a direction perpendicular to an optical direction in order to offset vibration (movement) generated from an image by an external force.

In general, a lens driving device takes a shape in which various parts are embedded within an inner space formed by a cover and a base. There is a difficulty in obtaining an adhesive space (sealing space) for the cover and the base because of request for demand on reduction in overall size of a camera module.

DETAILED DESCRIPTION OF THE INVENTION

Technical Subject

The present exemplary embodiment is to provide a lens driving device for obtaining an adhesive space for a cover and a base.

Technical Solution

A lens driving device according to an exemplary embodiment comprises: a cover; a housing disposed in the cover; a bobbin disposed in the housing; a magnet disposed in the housing; a first coil disposed in the bobbin and facing the magnet; a first substrate disposed below the housing and comprising a second coil facing the magnet; a second substrate disposed below the first substrate; and a base disposed below the second substrate, wherein the base comprises a body and a protrusion upwardly protruding from the body, the outer side of the second substrate is disposed to face the inner side of the protrusion, and the upper surface of the protrusion is in a location which is the same as or lower than that of the upper surface of the first substrate.

A length between an upper surface of the protrusion and an upper surface of body of the base may be same as or shorter than a length from the upper surface of first substrate to a lower surface of the second substrate.

The upper surface of the protrusion may be same as a height of the upper surface of the second substrate.

The cover may comprise an upper plate and a lateral plate downwardly extended from the upper plate, wherein the outside surface of the protrusion may face an inner surface of the lateral plate of cover, and an adhesive may be interposed between the outside surface of the protrusion and the lateral plate of the cover.

An outside of base may face an inner surface of the lateral plate of cover, and the outside of base may be formed with a staircase, and an upper surface of the staircase may be disposed with a lower surface of lateral plate of cover.

The outside of protrusion may be extended upwardly from outside surface of base.

A width of upper surface of staircase may be same as or greater than a thickness of the lateral plate of cover.

A height of protrusion may be more than 0.1 mm but less than 0.5 mm.

A height of protrusion may be more than 80% of a thickness of the second substrate.

An upper surface of protrusion may be in a location which is the same as or lower than that of a lower surface of the first substrate.

An upper surface of protrusion may face a lower surface of the first substrate.

An adhesive may be interposed between an inner surface of protrusion and an outside surface of second substrate.

The base may further comprise a first lateral surface, a second lateral surface disposed at an opposite side of the first lateral surface, a third lateral surface disposed perpendicularly to the first lateral surface and the second lateral surface, and a fourth lateral surface disposed at an opposite side of the third lateral surface, wherein the protrusion may comprise a first protrusion upwardly extended from the first lateral surface of base, a second protrusion upwardly extended from the second lateral surface of base, a third protrusion upwardly extended from the third lateral surface of base, and a fourth protrusion upwardly extended from a fourth lateral surface of base.

The second substrate may comprise a first connection substrate extended to a first lateral surface of base, and a second connection substrate extended to the second lateral surface of base, wherein the first lateral surface of base may comprise a first reception part disposed with the first connection substrate, the second lateral surface of base may comprise a second reception part disposed with the second connection substrate, the first protrusion may comprise a 1-1 protrusion disposed at one side of the first reception part by being mutually spaced apart, and a 1-2 protrusion disposed at the other side of the first reception part, the second protrusion may comprise a 2-1 protrusion disposed at one side of the second reception part by being mutually spaced apart, and a 2-2 protrusion disposed at the other side of the second reception part.

The cover may comprise an upper plate and a first lateral plate downwardly extended from the upper plate, and the base may further comprise a first staircase outwardly protruded from the first lateral surface to support the first lateral plate.

An inner lateral surface of the first lateral plate may face the first lateral surface and an outer lateral surface of the first protrusion, and an adhesive may be interposed between the inner lateral surface of the first lateral plate and the first lateral surface, and between the inner lateral surface of the first lateral plate and the outer lateral surface of the first protrusion.

A camera module according to an exemplary embodiment comprises: a cover; a housing disposed inside of the cover; a bobbin disposed inside of the housing; a lens module disposed inside of the bobbin; a magnet disposed on the housing; a first coil disposed on the bobbin to face the magnet; a first substrate comprising a second coil disposed underneath the housing to face the magnet; a second substrate disposed underneath the first substrate; a base disposed underneath the second substrate; a main substrate disposed underneath the base; and an image sensor mounted on the main substrate, wherein the base may comprise a body and a protrusion protruded upwardly from the body, the outer lateral surface of the second substrate may be so disposed as to face an inner lateral surface of the protrusion, and an upper surface of the protrusion may be in a location which is the same as or lower than that of an upper surface of the first substrate.

A lens driving device according to an exemplary embodiment comprises: a cover; a housing disposed inside of the cover; a bobbin disposed inside of the housing; a magnet disposed on the housing; a first coil disposed on the bobbin to face the magnet; a first substrate comprising a second coil disposed underneath the housing to face the magnet; a second substrate disposed underneath the first substrate; and a base disposed underneath the second substrate, wherein the base may comprise a protrusion upwardly protruded from an edge, a width of the first substrate may be greater than that of the second substrate such that a portion of a lower surface of the first substrate may be exposed from the second substrate, an upper surface of the protrusion may be overlapped to a perpendicular direction with the exposed lower surface of the first substrate, and an outer lateral surface of the protrusion may face the cover and an adhesive may be interposed between the outer lateral surface of the protrusion and the cover.

Advantageous Effects

In the present exemplary embodiment, a base is added with a protrusion, and the protrusion is coupled to an inner lateral surface of cover by an adhesive. In order to secure a space for arranging the protrusion of base, a second substrate is escaped, and the protrusion of base is disposed on a spare space by the escape of the second substrate. As a result, an entire size of camera module can be maintained to secure a sufficient sealing area. Furthermore, a substrate can be accurately guided by the protrusion when the base and the second substrate are coupled.

BEST MODE

Figure 1:
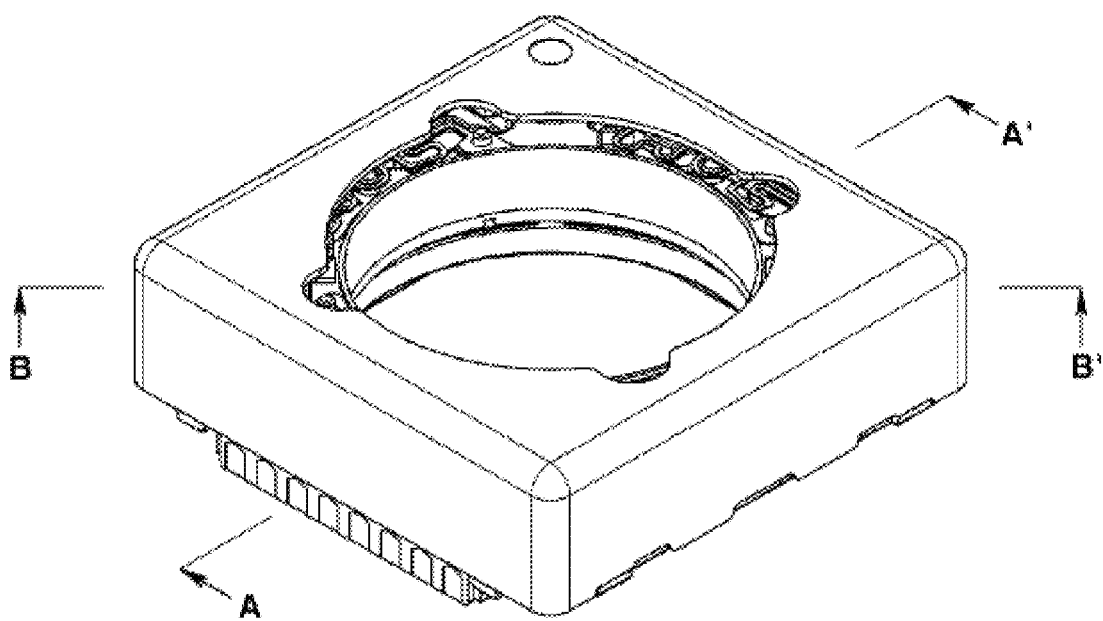
FIG. 1 is a perspective view of a lens driving device according to an exemplary embodiment of the present invention.

Some exemplary embodiments of present invention will be described in detail with reference to the accompanying drawings. In describing a reference numeral for each element, a same reference numeral will be designated, if possible, for the same element, albeit being differently indicated on other drawings. In the following description, well-known functions or constructions are not described in detail to avoid obscuring the present invention in unnecessary detail.

In describing elements in the exemplary embodiments of the present invention, the terms of first, second, A, B (a), (b), etc., may be used. These terms may be used only to distinguish one element from another element, and the nature, order or sequence is not restricted by these terms. When an element is referred to as being "accessed to", "coupled to," or "connected to," another element, it should be appreciated that the element may be directly accessed, connected or coupled to the other element, or intervening elements may be present therebetween.

The hereinafter-used term of "optical axis direction" may be defined as an optical axis direction of a lens module coupled to a lens driving device. Meantime, the "optical axis direction" may be interchangeably used with a "horizontal direction", a "vertical direction" and a "z axis direction".

The hereinafter-used term of "auto focus function" may be defined as a function of automatically matching a focus of a subject by adjusting a distance to an image sensor by moving a lens module to an optical axis direction according to a distance to the subject in order to obtain a clear image of the subject from an image sensor. Meantime, the "auto focus" may be interchangeably used with an "AF (Auto Focus)".

The term of 'handshake correction function' used hereinafter may be defined as a function of moving or tilting a lens module to a direction perpendicular to an optical axis in order to offset a vibration (movement) generated by an external force on an image sensor. Meantime, the 'handshake correction' may be interchangeably used with the 'OIS (Optical Image Stabilization)'.

Hereinafter, a configuration of an optical device according to an exemplary embodiment of the present invention will be described.

The optical device may be any one of a hand phone, a mobile phone, a smart phone, a portable smart device, a digital camera, a notebook computer (laptop computer), a digital broadcasting terminal, a PDA (Personal Digital Assistant), a PMP (Portable Multimedia Player) and a navigation device. However, the present invention is not limited thereto, and may comprise any device capable of capturing an image or a photograph.

The optical device according to an exemplary embodiment may comprise a main body (not shown), a display panel (not shown, display part) disposed at one side (one surface) of the main body to display information and a camera module (10) disposed inside of the main body to photograph an image or a photograph. The camera module (10) may be electrically connected to a display panel to allow an image or a photograph captured by the camera module (10) to be reproduced by the display panel.

Hereinafter, configuration of a camera module according to an exemplary embodiment of the present invention will be described with reference to the accompanying drawings.

The camera module (not shown) according to an exemplary embodiment may comprise a lens module (not shown), an infrared filter (not shown), a main substrate (not shown), an image sensor (not shown), a controller (not shown) and a lens driving device (1000).

The lens module may comprise a lens and a lens barrel. The lens module may comprise one or more lenses (not shown) and a lens barrel accommodating the said one or more lenses. However, one element of the lens module is not limited to the lens barrel, and any holder structure capable of supporting one or more lenses may suffice for a lens module. The lens module may be coupled to the lens driving device (1000) to move along with the lens driving device (1000). The lens module may be disposed inside of a bobbin (200) of the lens driving device (1000), for example. In this case, the lens module and an inside of the bobbin (200) may be brought into contact. The lens module may be screw-connected to the bobbin (200). For example, the lens module may be coupled with the bobbin (200) of the lens driving device (1000) using an adhesive. Meantime, a light having passed the lens module may be irradiated on an image sensor.

The main substrate may be a PCB (Printed Circuit Board). The main substrate may support the lens driving device (1000). The main substrate may be mounted with an image sensor. For example, an inner upper side of the main substrate may be disposed with an image sensor, and an outer upper surface of main substrate may be disposed with a sensor holder (not shown). An upper side of the sensor holder may be disposed with a lens driving device (1000). Alternatively, an upper outside of the main substrate may be disposed with a lens driving device (1000) and an inner upper side of main substrate may be disposed with an image sensor. Through this configuration, a light having passed the lens module accommodated inside of the lens driving device (1000) may be irradiated on an image sensor mounted on the main substrate. The main substrate may supply a power to the lens driving device (1000). Meantime, the main substrate may be disposed with a controller for controlling the lens drive device (1000).

The image sensor may be disposed on an upper surface of main substrate. The image sensor may be mounted on the main substrate. The image sensor may be so disposed as to match in optical axis to a lens module. Through this configuration, the image sensor may obtain a light having passed the lens module. The image sensor may output the irradiated light in an image. The image sensor may be a CCD (Charge Coupled Device), a MOS (Metal Oxide Semi-Conductor), a CPD and a CID. However, the types of image sensor are not limited thereto The infrared filter may shield a light of infrared region from being incident on an image sensor. The infrared filter may be interposed between the lens module and the image sensor. For example, the infrared filter may be mounted on a hole formed at a center of the base (800). However, the infrared filter may be disposed on a holder member (not shown) separately disposed from the base (800). However, the infrared filter may be mounted on a hole formed at a center of the base (800). The infrared filter may be formed by allowing an infrared cut-off coating material to be coated on a plate-shaped optical filter such as an imaging plane protection cover glass or a cover glass.

The controller may be mounted on the main substrate. The controller may be disposed at an outside of the lens driving device (1000). However, the controller may be disposed on an inside of the lens driving device (1000). The controller may individually control a direction, intensity and an amplitude of a current supplied to each element comprising the lens driving device (1000). The controller may perform any one or more of an AF function and an OIS function of the camera module by controlling the lens driving device (1000). That is, the controller may move or tilt the lens module to an optical axis direction or to a direction perpendicular to the optical axis direction by controlling the lens driving device (1000).

Furthermore the controller may perform a feedback control of the AF function and a feedback control of the OIS function. To be more specific, the controller may receive a position of a bobbin (200) and a housing (400) detected by a first sensor (930) and a second sensor (940) to perform an accurate AF function and OIS function by controlling a current or a power applied to a first coil (300) and a second coil (900).

Hereinafter, a lens driving device according to an exemplary embodiment will be described. The lens driving device (1000) according to an exemplary embodiment may perform an AF function by allowing a bobbin (200) to move an optical axis direction (horizontal, vertical direction) in response to an electromagnetic interaction between a first coil (300) and a magnet (500). In this case, the bobbin (200) may perform a unidirectional driving that returns after moving from an initial position to an upward direction, and may perform bi-directional driving that returns after moving from an initial position to an upward or downward direction. Furthermore, the lens driving device (1000) according to an exemplary embodiment may perform an OIS function by allowing a housing (400) to move or tilt to a direction perpendicular to an optical axis direction in response to an electromagnetic interaction between a second coil (900) and a magnet (300).

Hereinafter, a lens driving device (1000) according to an exemplary embodiment will be described with reference to the accompanying drawings.

Figure 2:
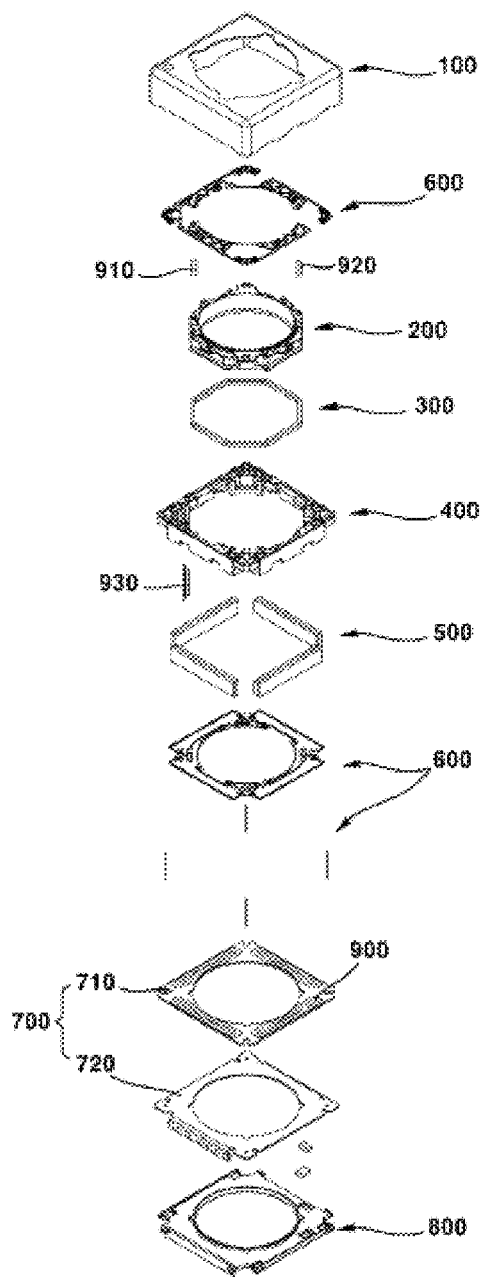
FIG. 2 is an exploded perspective view of a lens driving device according to an exemplary embodiment of the present invention.
Figure 3:
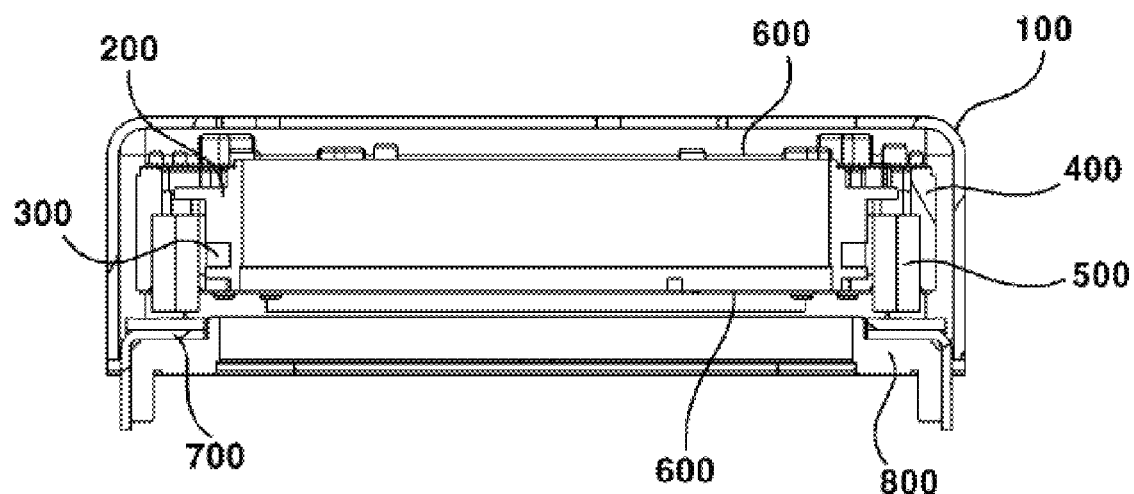
FIG. 3 is a cross-sectional view taken along line A-A' of a lens driving device according to an exemplary embodiment of the present invention.
Figure 4:
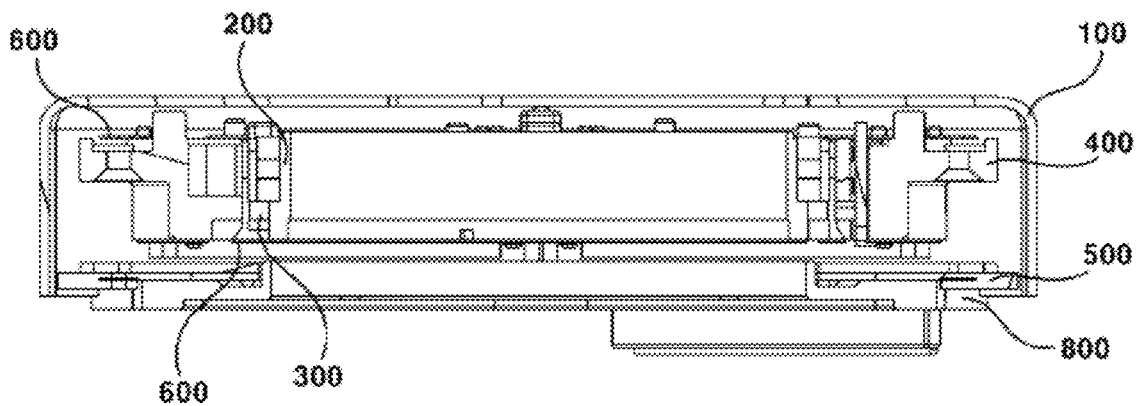
FIG. 4 is a cross-sectional view taken along line B-B' of a lens driving device according to an exemplary embodiment of the present invention.
Figure 5:
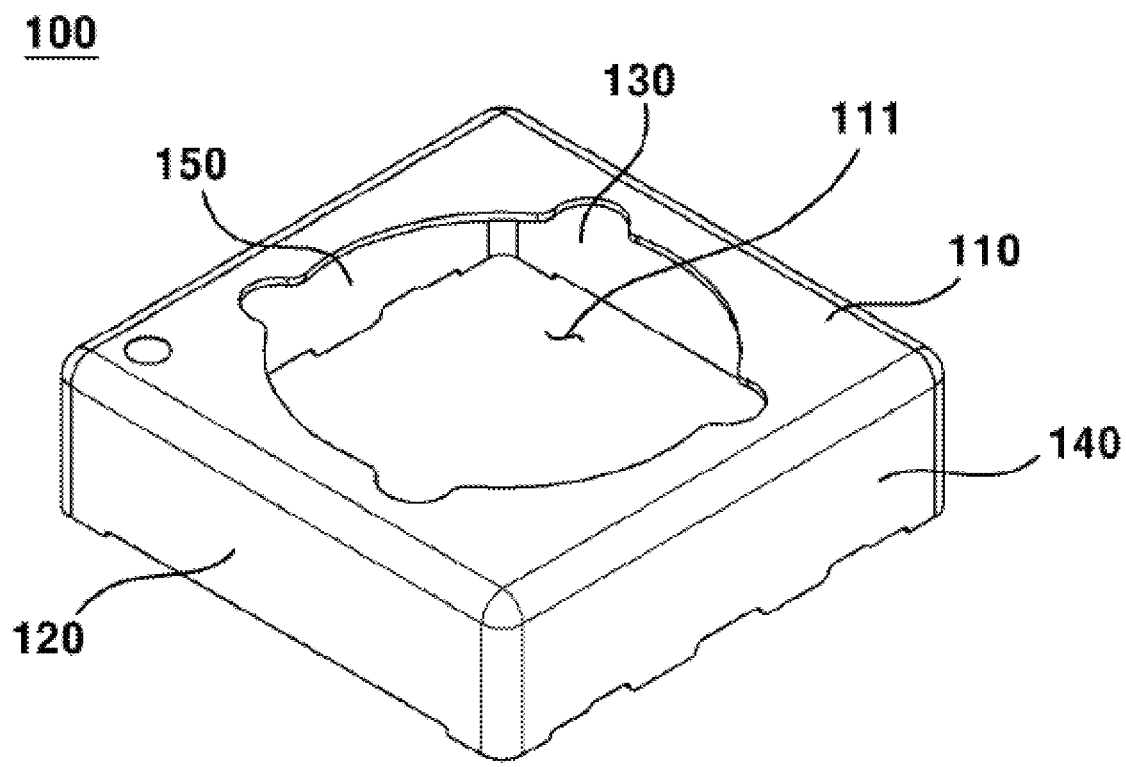
FIG. 5 is a perspective view illustrating a cover according to an exemplary embodiment of the present invention.
Figure 6:
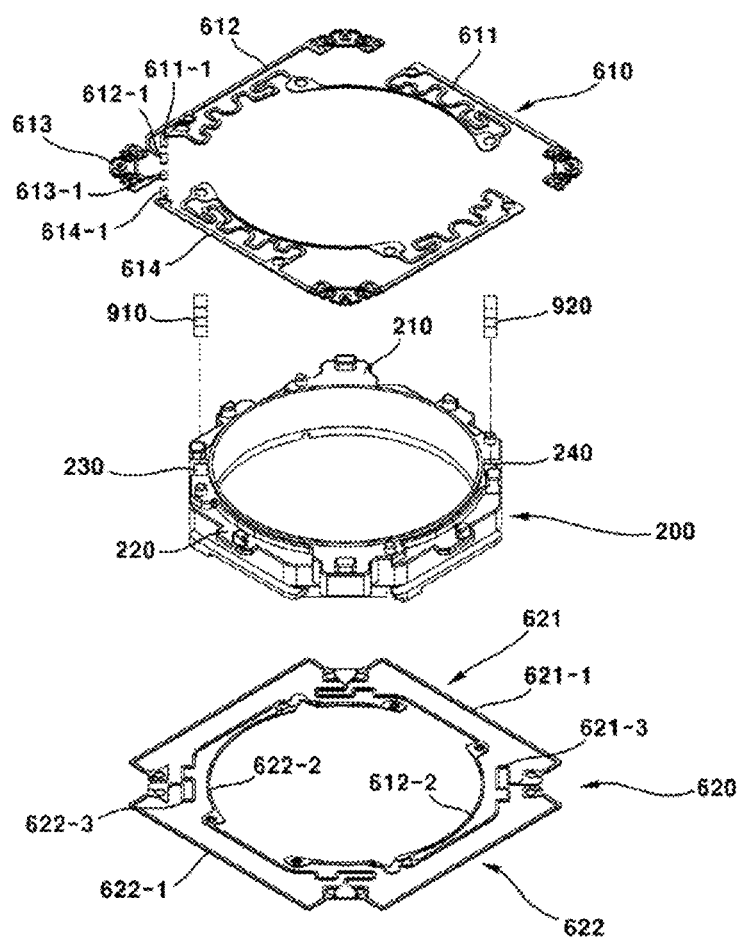
FIG. 6 is an exploded perspective view illustrating a bobbin, a first elastic member, a second elastic member, a sensing magnet and compensation magnet according to an exemplary embodiment of the present invention.
Figure 7:
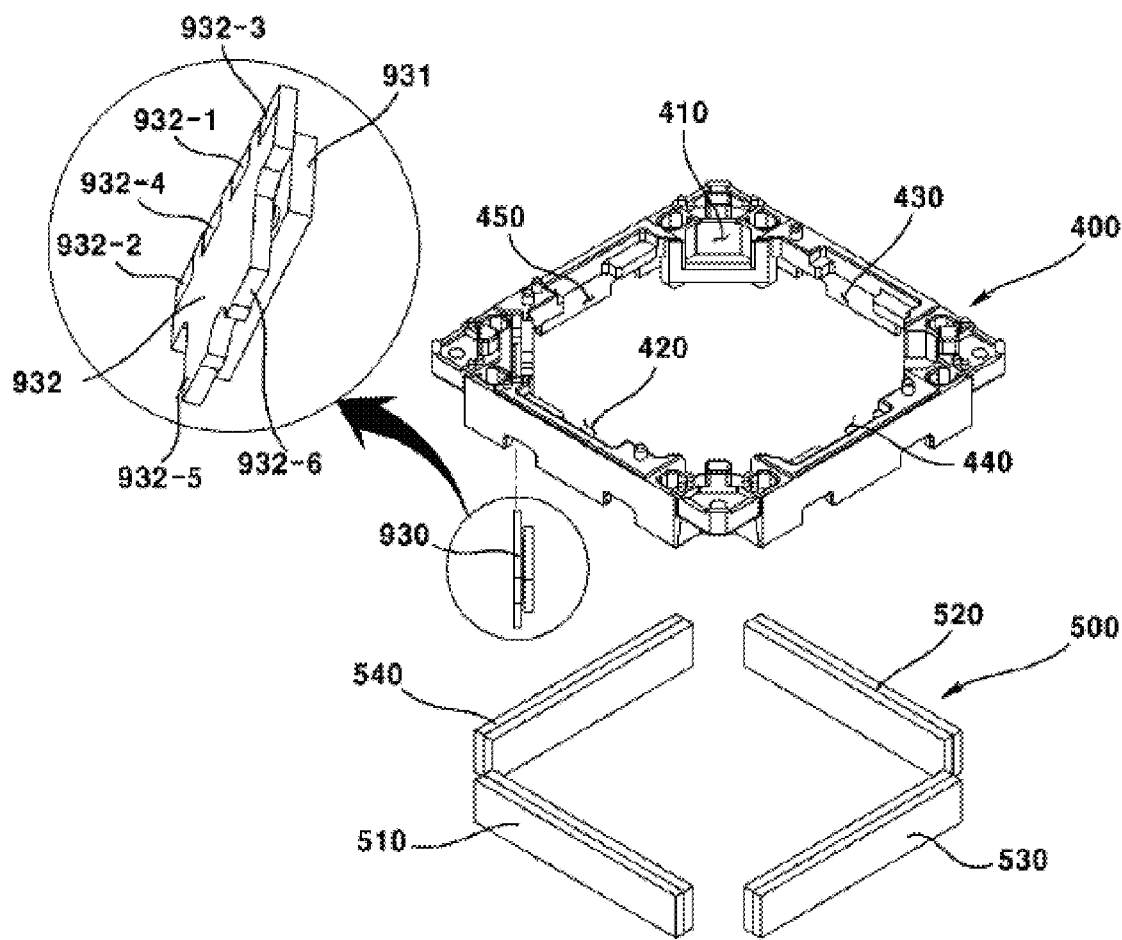
FIG. 7 is an exploded perspective view illustrating a housing, a magnet and a first sensor according to an exemplary embodiment of the present invention.
Figure 8:
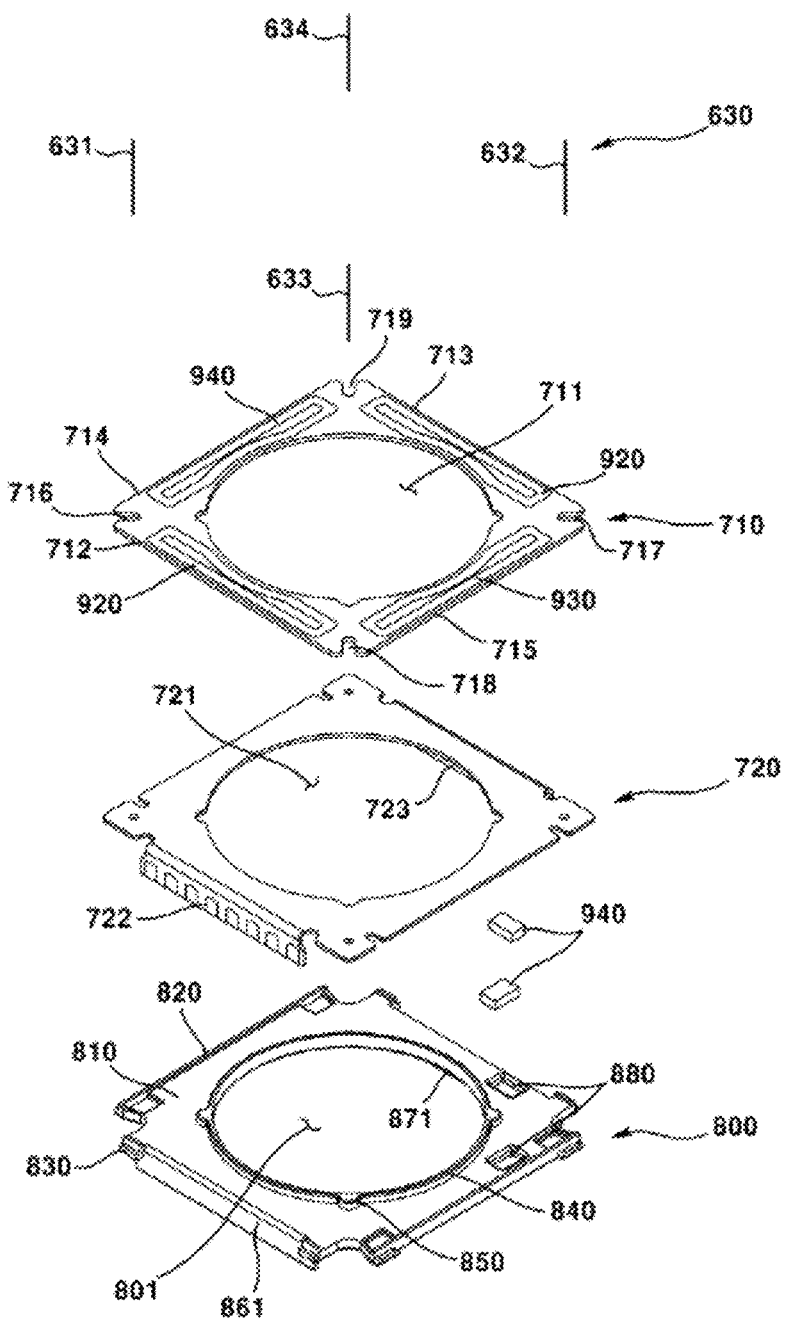
FIG. 8 is an exploded perspective view illustrating a substrate, a base, a third elastic member, a second coil and a second sensor according to an exemplary embodiment of the present invention.
Figure 9:
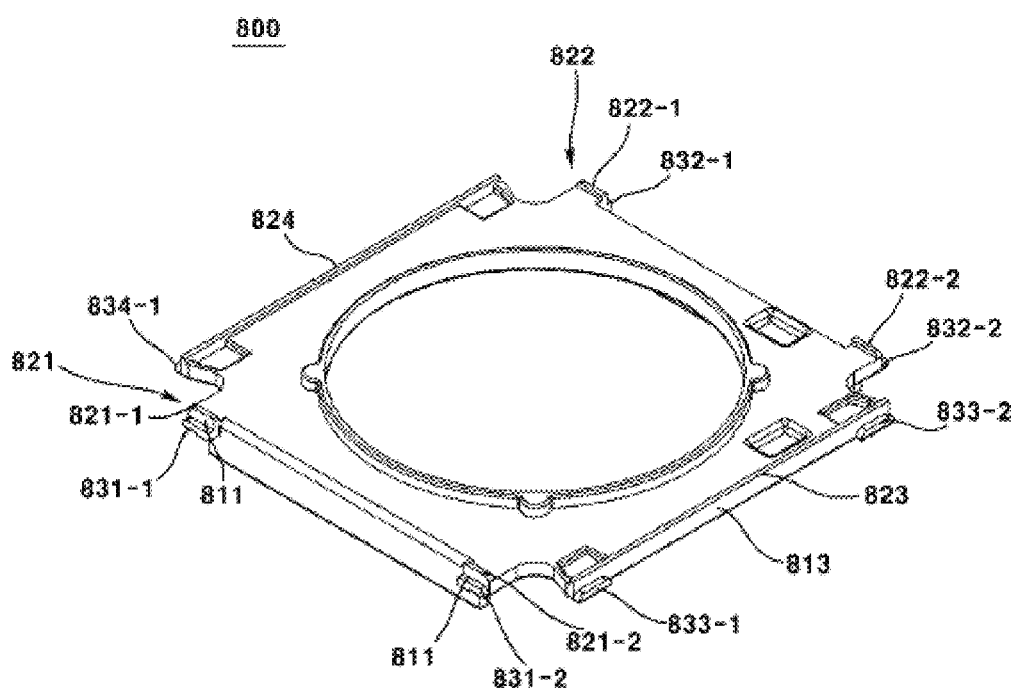
FIG. 9 is a perspective view of a base according to an exemplary embodiment of the present invention.
Figure 10:
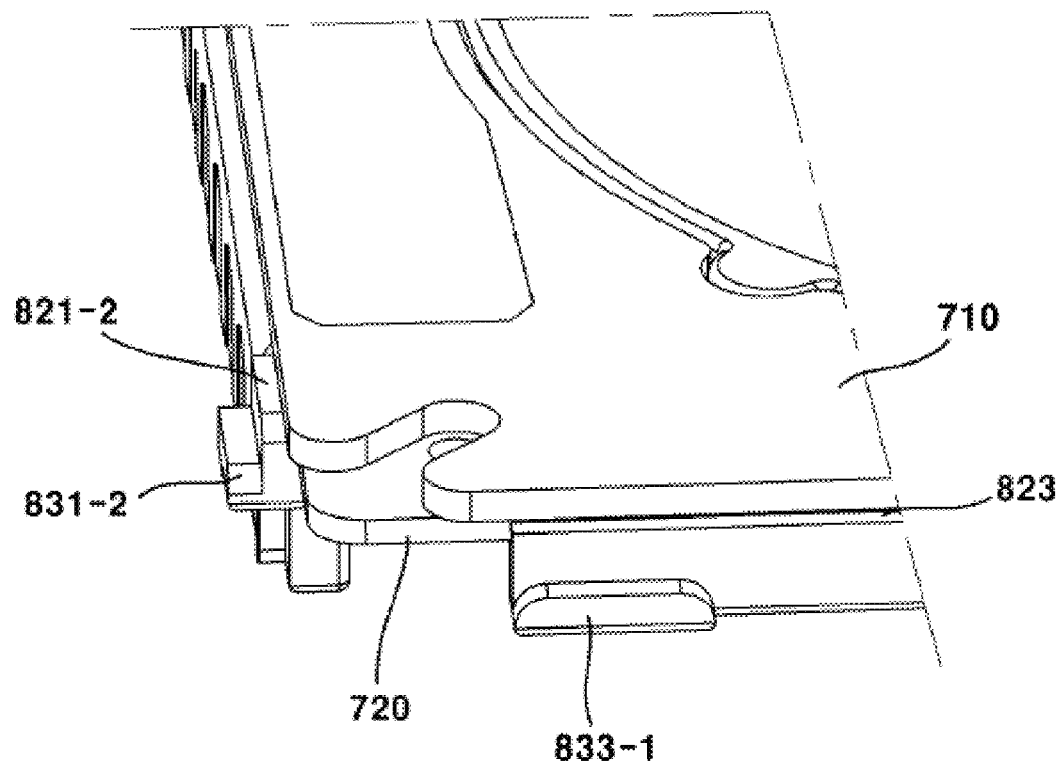
FIG. 10 is a perspective view illustrating a portion of a substrate and a base according to an exemplary embodiment of the present invention.
Figure 11:
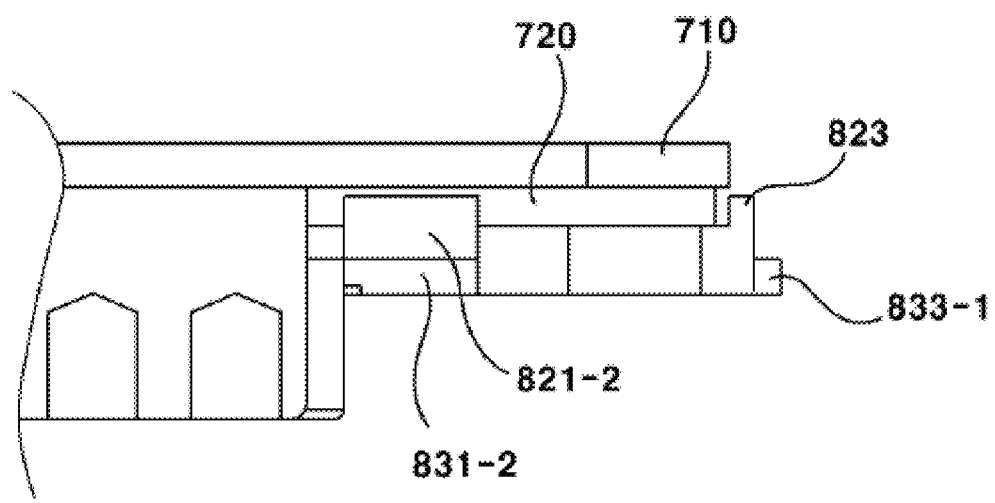
FIG. 11 is a lateral view of FIG. 10.
Figure 12:
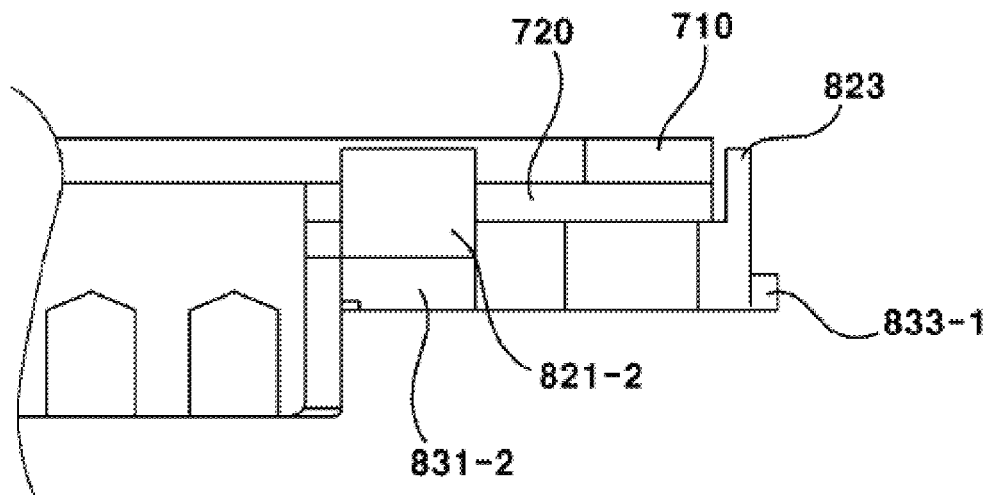
FIG. 12 is a lateral view of a substrate and a base of a first modification of an exemplary embodiment from a prospective of FIG. 11.
Figure 13:
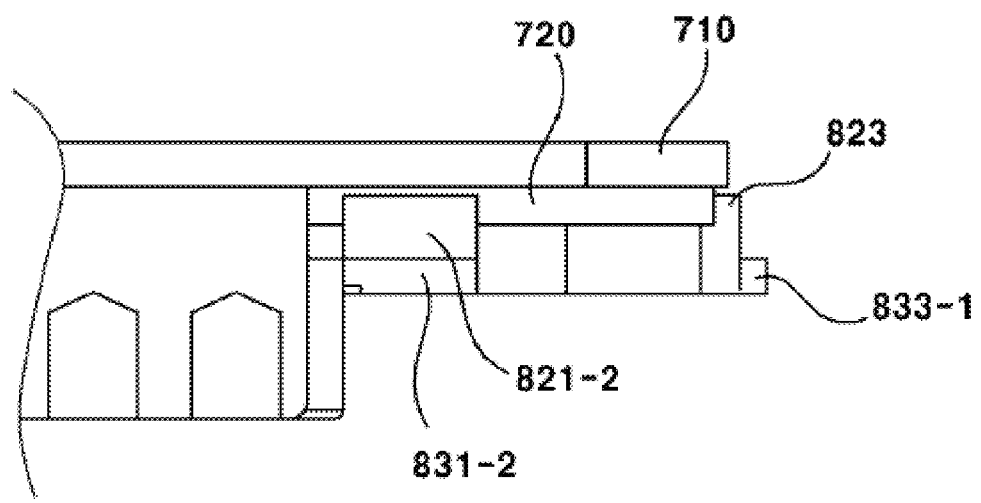
FIG. 13 is a lateral view of a substrate and a base of second modification of an exemplary embodiment from a prospective of FIG. 11.

FIG. 1 is a perspective view of a lens driving device according to an exemplary embodiment of the present invention, FIG. 2 is an exploded perspective view of a lens driving device according to an exemplary embodiment of the present invention, FIG. 3 is a cross-sectional view taken along line A-A' of a lens driving device according to an exemplary embodiment of the present invention, FIG. 4 is a cross-sectional view taken along line B-B' of a lens driving device according to an exemplary embodiment of the present invention, FIG. 5 is a perspective view illustrating a cover according to an exemplary embodiment of the present invention, FIG. 6 is an exploded perspective view illustrating a bobbin, a first elastic member, a second elastic member, a sensing magnet and compensation magnet according to an exemplary embodiment of the present invention, FIG. 7 is an exploded perspective view illustrating a housing, a magnet and a first sensor according to an exemplary embodiment of the present invention, FIG. 8 is an exploded perspective view illustrating a substrate, a base, a third elastic member, a second coil and a second sensor according to an exemplary embodiment of the present invention, FIG. 9 is a perspective view of a base according to an exemplary embodiment of the present invention, FIG. 10 is a perspective view illustrating a portion of a substrate and a base according to an exemplary embodiment of the present invention, FIG. 11 is a lateral view of FIG. 10, FIG. 12 is a lateral view of a substrate and a base of a first modification of an exemplary embodiment from a prospective of FIG. 11, and FIG. 13 is a lateral view of a substrate and a base of second modification of an exemplary embodiment from a prospective of FIG. 11.

The lens driving device (1000) according to an exemplary embodiment may comprise a cover (100), a bobbin (200), a first coil (300), a housing (400), a magnet (500), an elastic member (600), a substrate (700), a base (800), a second coil (900), a sensing magnet (910), a compensation magnet (920), a first sensor (930) and a second sensor (940).

The cover (100) may be an external member of the lens driving device (1000). The cover (100) may comprise a square plate shaped upper plate (110) and a plurality of lateral plates (120, 130, 140, 150) each downwardly extended from each side of the upper plate (110). The upper plate (110) may be formed with a hole (111) about an optical axis. The cover (100) may be substantially opened at a lower surface, and an upper surface thereof may take a cubic shape or a square shape disposed with a hole (111) aligned with an optical axis.

The cover (100) may be disposed thereunder with a base (800). The cover (100) may be supported by the base (800). The cover (100) and the base (800) may be coupled by an adhesive. An opened lower surface of cover (100) may be disposed with a base (800). As a result, an inner space may be formed by the cover (100) and the base (800).

The cover (100) may be accommodated therein by a bobbin (200), a first coil (300), a housing (400), a magnet (500), an elastic member (600), a substrate (700), a second coil (900), a sensing magnet (910), a compensation magnet (920), a first sensor (930) and a second sensor (940).

The material of cover (100) may comprise a metal. In this case, the cover (100) may inhibit an external electronic device from entering thereinside and inhibit an internal electronic device from being discharged to outside. That is, the cover (100) can shield an electronic wave. Thus, the cover (100) may be called as a "shield can". However, the material of cover (100) is not limited thereto. For example, a material of cover (100) may comprise a plastic. In this case, the cover (100) may be manufactured by plastic injection.

The plurality of lateral plates (120, 130, 140, 150) of cover (100) may comprise a first lateral plate (120), a second lateral plate (130), a third lateral plate (140) and a fourth lateral plate (150). The first lateral plate (120) and the second lateral plate (130) may be so disposed as to face each other (An opposite side of first lateral plate may be disposed with the second lateral plate, and vice versa). The third lateral plate (140) and the fourth lateral plate (150) may be so disposed as to face each other (An opposite side of third lateral plate may be disposed with the fourth lateral plate, and vice versa). The third lateral plate (140) and the fourth lateral plate (150) may be interposed between the first lateral plate (120) and the second lateral plate (130), and vice versa. The first lateral plate (120) and the second lateral plate (130) may be connected by the third lateral plate (140) and the fourth lateral plate (150), and vice versa. The first lateral plate (120) and the second lateral plate (130) may be so disposed as to be parallel to each other. The third lateral plate (140) and the fourth lateral plate (150) may be so disposed as to be parallel to each other.

The bobbin (200) may take a hollowed shape formed with a hole to an optical axis direction. The bobbin (200) may be mounted with a lens module. The lens module may be disposed inside of the bobbin (200). The bobbin (200) may be mounted with a first coil (300). In this case, the first coil (300) may be disposed on an outer surface (outer circumferential surface) of bobbin (200).

The bobbin (200) may be disposed inside of a housing (400). An upper side of bobbin (200) may be disposed with a first elastic member (610). The bobbin (200) may be disposed thereunder with a second elastic member (620).

The bobbin (200) and the housing (400) may be elastically connected by the first elastic member (610) and the second elastic member (620). The bobbin (200) may be elastically supported by the first elastic member (610) and the second elastic member (620) to an optical axis (up/down direction, perpendicular direction).

The bobbin (200) may receive a driving force by an electromagnetic interaction between the first coil (300) and the magnet (500). The bobbin (200) may be moved to an optical axis direction by the driving force. The bobbin (200) may be moved both to one side and the other side (upper side and the other side) of optical axis direction by the driving force. In this case, the lens module may be integrally moved with the bobbin (200) to an optical axis direction to perform an AF function.

An upper surface and a lower surface of bobbin (200) may be protrusively formed with a plurality of bosses respectively inserted into a plurality of holes at the first elastic member (610) and the second elastic member (620). The bobbin (200) may comprise a first stopper (210), a second stopper (220), a first pocket (230) and a fourth pocket (240).

The first stopper (210) may take a shape outwardly protruding from an outer circumferential surface of bobbin (200). The first stopper (210) may be disposed at an upper side of first coil (300). The first stopper (210) may be received into a shield groove (410) of housing (400). The first stopper (210) and the shield groove (410) may have a mutually corresponding shape. The rotation of bobbin (200) may be stopped by allowing the first stopper (210) to be hitched at the shield groove (410). The first stopper (210) may be in the number of two. One of the said two first stoppers (210) may be protruded toward a corner portion interposed between the first lateral plate (120) of cover (100) and the third lateral plate (140), and the remaining one first stopper of the said two stoppers (210) may be protruded toward a corner portion interposed between the second lateral plate (130) of cover (100) and the fourth lateral plate (150).

The second stopper (220) may take a shape outwardly protruding from an outer circumferential surface of bobbin (200). The second stopper (220) may be spaced apart from the first stopper (210). The second stopper (220) may be disposed at an upper side of first coil (410). The second stopper (220) may be disposed above the magnet (500). A lower surface of second stopper (220) and an upper surface of magnet (500) may face each other. A lower surface of second stopper (220) may be brought into contact with an upper surface of magnet (500) to inhibit the bobbin (200) from downwardly moving.

The second stopper (220) may be formed in the number of four (4). Each of the said four second stoppers (220) may be so disposed as to vertically correspond with a first magnet (510), a second magnet (520), a third magnet (530) and a fourth magnet (540). Each of the said four second stoppers (220) may be protruded toward the first lateral plate (120) of cover (100), the second lateral plate (130) of cover (100), the third lateral plate (140) of cover (100) and the fourth lateral plate (150) of cover (100).

The first pocket (230) may be received by a sensing magnet (910). The first pocket (230) may be so disposed as to correspond to a corner interposed between the first lateral plate (120) and the fourth lateral plate (150) of cover (100). The second pocket (240) may be received by a compensation magnet (920). The second pocket (240) may be so disposed as to be on an opposite side of the first pocket (230). The second pocket (240) may be so disposed as to correspond to a corner interposed between the second lateral plate (130) and the third lateral plate (140) of cover (100). The first pocket (230) and the second pocket (240) may be symmetrically disposed about an optical axis.

The first coil (300) may be a coil block wound on an outer circumferential surface of bobbin (200). The first coil (300) may be so disposed as to face the magnet (500). The first coil (300) may be electrically connected with the second elastic member (620). Toward this end, an end of one side (first lead wire) of the first coil (300) and the other end of the other side (second lead wire) may be respectively soldered to the second elastic member (620).

The housing (400) may take a hollowed shape formed with a hole to an optical axis direction. The housing (400) may be disposed in the cover (100). An upper side of housing (400) may be disposed with a first elastic member (610). A lower side of housing (400) may be disposed with a second elastic member (620). The bobbin (200) and the housing (400) may be elastically connected by the first elastic member (610) and the second elastic member (620).

The housing (400) may be disposed thereunder with a substrate (700) and a base (800). A lateral surface of housing (400) may be disposed with a third elastic member (630). The housing (400), the substrate and the base (800) may be elastically connected by the third elastic member (630). The housing (400) may be upwardly spaced apart from the substrate (700) by the third elastic member (630). The housing (400) may be elastically moved or tilted by the third elastic member (630) to a direction perpendicular to an optical axis.

The housing (400) may receive a driving force from an electromagnetic interaction between the second coil (900) and the magnet (500). The housing (400) may be moved or tilted by the driving force to a direction perpendicular to an optical axis. In this case, the lens module may perform an OIS function by being integrally moved or tilted with the housing (400) to a direction perpendicular to an optical axis direction.

The housing (400) may be disposed with a magnet (500). The housing (400) may be disposed with a first sensor (930). An upper surface and a lower surface of housing (400) may be protrusively formed with a plurality of bosses respectively inserted into a plurality of holes of the first elastic member (610) and the second elastic member (620). The housing (400) may comprise a shield groove (410), a first magnet reception part (420), a second magnet reception part (430), a third magnet reception part (440) and a fourth magnet reception part (450).

The shield groove (410) may be disposed at an inner lateral surface of housing (400). The shield groove (410) may take a shape by allowing an inner lateral surface of the housing (400) to be inwardly recessed. The shield groove (410) may be received by a first stopper (210) of bobbin (200). The shield groove (410) may be formed in the number of two (2). The said two shield grooves (410) may be so disposed as to mutually face each other.

The first magnet reception part (420) may be so disposed as to face the first lateral plate (120) of cover (100). The first magnet reception part (420) may be disposed with a first magnet (510). The second magnet reception part (430) may be so disposed as to face the second lateral plate (130) of cover (100). The second magnet reception part (430) may be disposed with a second magnet (520). The third magnet reception part (440) may be so disposed as to face the third lateral plate (140) of cover (100). The third magnet reception part (440) may be disposed with a third magnet (530). The fourth magnet reception part (450) may be so disposed as to face the fourth lateral plate (140) of cover (100). The fourth magnet reception part (450) may be disposed with a fourth magnet (540).

One of the two shield grooves (410) may be disposed at a corner interposed between the second magnet reception part (430) and the fourth magnet reception part (450), and the remaining other shield groove (410) may be disposed at a corner interposed between the first magnet reception part 410) and the third magnet reception part (440). The first sensor (930) may be disposed at a corner interposed between the first magnet reception part (420) and the fourth magnet reception part (450).

The magnet (500) may be disposed on the housing (400). The magnet (500) may be so disposed as to face the first coil (300) and the second coil (900). The magnet (500) may provide a driving force to the bobbin (200) and the housing (400) in response to an electromagnetic interaction between the first coil (300) and the second coil (900).

The magnet (500) may comprise a first magnet (510), a second magnet (520), a third magnet (530) and a fourth magnet (540). An inner lateral surface of the first magnet (510), the second magnet (520), the third magnet (530) and the fourth magnet (540) may face the first coil (300). A lower surface of first magnet (510) may face a 2-1 coil (901). A lower surface of second magnet (520) may face a 2-2 coil (902). A lower surface of third magnet (530) may face a 2-3 coil (903). A lower surface of fourth magnet (540) may face a 2-4 coil (904).

Hereinafter, the elastic member (600) will be described. The elastic member (600) may comprise a first elastic member (610), a second elastic member (620) and a third elastic member (630). The first elastic member (610) and the second elastic member (620) may elastically connect the bobbin (200) and the housing (400). The bobbin (200) may be so elastically supported as to be moved to an optical axis direction (horizontal, vertical direction) by the first elastic member (610) and the second elastic member (620). The third elastic member (630) may elastically connect the housing (400), the substrate (700) and the base (800). The housing (400) may be elastically supported by the third elastic member (630) so as to be moved or tilted to a direction perpendicular to an optical axis direction.

The first elastic member (610) may be a plate spring. The first elastic member (610) may be disposed at an upper side of the bobbin (200) and the housing (400). The first elastic member (610) may be respectively coupled to an upper surface (upper side) of bobbin (200) and an upper surface (upper side) of housing (400). The first elastic member (610) may elastically connect the bobbin (200) and the housing (400). The first elastic member (610) may elastically support the bobbin (200) to an optical axis direction (horizontal direction, vertical direction). The first elastic member (610) may be electrically connected to the first sensor (930). The first elastic member (610) may be electrically connected to the third elastic member (630).

The first elastic member (610) may comprise a 1-1 elastic member (611), a 1-2 elastic member (612), a 1-3 elastic member (613) and a 1-4 elastic member (614), each mutually spaced apart.

The 1-1 elastic member (611) may be disposed on an upper surface (upper side) of first corner (a corner interposed between the first magnet reception part and the fourth magnet reception part) of housing. The 1-1 elastic member (611) may be extended from an upper surface (upper side) of the first corner of housing to the first sensor (930). An area disposed on the first corner of the upper surface (upper side) of housing on the 1-1 elastic member (611) may be electrically connected to a first wire (631) of the third elastic member (630). A distal end of an area extended from the 1-1 elastic member (611) may be formed with a first terminal (611-1). The first terminal (611-1) may be electrically connected to a second sensor terminal (932-2) of the first sensor (930).

The 1-2 elastic member (612) may comprise an external elastic part, an internal elastic part and a connection elastic part. The external elastic part of the 1-2 elastic member (612) may be disposed on an upper surface (upper side) of housing. An area from an external elastic part of the 1-2 elastic member (612) to an upper surface (upper side) of second corner (corner interposed between the second magnet reception part and the third magnet reception part) of housing may be electrically connected to a second wire (632) of the third elastic member (630). An internal elastic part of the 1-2 elastic member (612) may be disposed at an upper surface (upper side) of bobbin. That is, an internal elastic part of the 1-2 elastic member (612) may be disposed at an area more inwardly than the external elastic part of the 1-2 elastic member (612). The inner elastic part of the 1-2 elastic member (612) may be formed with a second terminal (612-1). The second terminal (612-2) may be electrically connected to a fourth sensor terminal (932-4) of the first sensor (930). The inner elastic part of the 1-2 elastic member (612) may be divided to more than two members. A connection elastic part of the 1-2 elastic member (612) may connect the outer elastic part of the 1-2 elastic member (612) and the inner elastic part, and may connect the divided inner elastic part of the 1-2 elastic member (612).

The 1-3 elastic member (613) may comprise an external elastic part, an internal elastic part and a connection elastic part. The external elastic part of the 1-3 elastic member (613) may be disposed at an upper surface (upper side) of housing. An area from an external elastic part of the 1-3 elastic member (613) to an upper surface (upper side) of third corner (corner interposed between the first magnet reception part and the third magnet reception part) of housing may be electrically connected to a third wire (633) of the third elastic member (630). An external elastic part of the 1-3 elastic member (613) may be extended to the first sensor (930). A distal end of an area extended from the external elastic part of the 1-3 elastic member (613) to the first sensor (930) may be formed with a third terminal (613-1). The third terminal (613-1) may be electrically connected to a first sensor terminal (932-1) of the first sensor (930). An internal elastic part of the 1-3 elastic member (630) may be disposed at an upper surface (upper side) of bobbin. The connection elastic part of the 1-3 elastic member (630) may connect the external elastic part of the 1-3 elastic member (630) and the internal elastic part.

A 1-4 elastic member (614) may be disposed at an upper surface (upper side) of fourth corner (corner interposed between the second magnet reception part and the fourth magnet reception part) of housing. The 1-4 elastic member (614) may be extended from an upper surface (upper side) of fourth corner of housing to the first sensor (930). An area disposed on the fourth corner of upper surface (upper side) of housing at the 1-4 elastic member (614) may be electrically connected to a fourth wire (634) of the third elastic member (630). A distal end of an area extended from the 1-4 elastic member (614) may be formed with a fourth terminal (614-1). The fourth terminal (614-1) may be electrically connected to a third sensor terminal (932-3) of the first sensor (930).

As noted above, the first elastic member (610) may be divided to four elastic members, one of the four elastic members may electrically connect the first wire (631) and the second sensor terminal (932-2), one of the remaining members may electrically connect the second wire (622) and the fourth sensor terminal (932-4), one of the remaining members may electrically connect the third wire (623) and the first sensor terminal (932-1), and a remaining one may electrically connect the fourth wire (624) and the third sensor terminal (932-3).

The second elastic member (620) may be a plate spring. The second elastic member (620) may be disposed at a lower side of the bobbin (200) and the housing (400). The second elastic member (620) may be respectively coupled to a lower surface (lower side) of bobbin (200) and a lower surface (lower side) of housing (400). The second elastic member (620) may elastically connect the bobbin (200) and the housing (400). The second elastic member (620) may elastically support the bobbin (200) to an optical axis direction (horizontal direction, vertical direction). The second elastic member (620) may be electrically connected to the first sensor (930). The second elastic member (620) may be electrically connected to the first coil (300).

The second elastic member (620) may comprise a 2-1 elastic member (621) and a 2-2 elastic member (622), each mutually spaced apart from the other. The 2-1 elastic member (621) may be electrically connected to one end (first lead wire) of first coil (300). The 2-1 elastic member (621) may be electrically connected to a fifth sensor terminal (932-5) of first sensor (930). The 2-2 elastic member (622) may be electrically connected to the other end (second lead wire) of first coil (300). The 2-2 elastic member (622) may be electrically connected to a sixth sensor terminal (932-6) of first sensor (930).

The 2-1 elastic member (621) may comprise an external elastic part (621-1), an internal elastic part (621-2) and a connection elastic part (621-3). The external elastic part (621-1) of the 2-1 elastic member (621) may be disposed at a lower surface (lower side) of housing (400). An end of external elastic part (621-1) of the 2-1 elastic member (621)

may be formed with a fifth terminal (621-4) disposed at a first corner of housing (400). The fifth terminal (621-4) may be electrically connected to a fifth sensor terminal (932-5) of the first sensor (930). The internal elastic part (621-2) of the 2-1 elastic member (621) may be disposed at a lower surface (lower side) of bobbin (200). The internal elastic part (621-2) of the 2-1 elastic member (621) may be electrically connected to an end of one side (first lead wire) of first coil (300). The connection elastic member (621-3) of 2-1 elastic member (621) may connect the external elastic part (621-1) of the 2-1 elastic member (621) and the internal elastic part (621-2) of the 2-1 elastic member (621).

The 2-2 elastic member (622) may comprise an external elastic part (622-1) and an internal elastic part (622-2) and a connection elastic member (622-3). The external elastic part (622-1) of the 2-2 elastic member (622) may be disposed at a lower side (lower surface) of housing (400). An end of the external elastic part (622-1) of the 2-2 elastic member (622) may be formed with a sixth terminal (622-4) disposed at the first corner of housing (400). The sixth terminal (622-4) may be electrically connected to a sixth sensor terminal (932-6) of first sensor (930). The internal elastic part (622-2) of the 2-2 elastic member (622) may be disposed at a lower side (lower surface) of bobbin (200). The internal elastic part (622-2) of the 2-2 elastic member (622) may be electrically connected to an end of the other side (second lead wire) of first coil (300). The connection elastic member (622-3) of the 2-2 elastic member (622) may connect the external elastic part (622-1) of the 2-2 elastic member (622) and the internal elastic part (622-2) of the 2-2 elastic member (622).

As noted from foregoing discussion, the second elastic member (620) may be divided to two elastic members, one of the said two elastic members may electrically connect the first coil (300) and the fifth sensor terminal (932-5), and the remaining one may electrically connect the first coil (300) and the sixth sensor terminal (932-6).

The third elastic member (630) may be a plurality of wires. The third elastic member (630) may be extended from the housing (400) to the substrate (700). The third elastic member (630) may elastically connect the housing (400) and the substrate (700). An upper surface of third elastic member (630) may be coupled with the housing (400). A lower surface of the third elastic member (630) may be coupled with the substrate (700). The third elastic member (630) may elastically support the housing (400). The housing (400) may be elastically supported so as to be moved or tilted to a direction perpendicular to an optical axis by the third elastic member (630). The third elastic member (630) may be electrically connected to the first elastic member (610). The third elastic member (630) may be electrically connected to the second substrate (720).

The third elastic member (630) may comprise a first wire (631), a second wire (632), a third wire (633) and a fourth wire (634).

The first wire (631) may be downwardly extended from an upper side (upper surface) of the first corner at the housing (400). In this case, the first wire (631) may pass through a first substrate (710) through a first through hole (716). An upper end of first wire (631) may be soldered to the 1-1 elastic member (611). Thus, the first wire (631) may be electrically connected to the 1-1 elastic member (611). A lower end of first wire (631) may be soldered to a second substrate (720). Thus, the first wire (631) may be electrically connected to the second substrate (720). The first wire (631) may electrically connect the 1-1 elastic member (611) and the second substrate (720).

The second wire (632) may be downwardly extended from an upper side (upper surface) of second corner of housing (400). In this case, the second wire (632) may pass through a first substrate (710) through a second through hole (717). An upper end of second wire (632) may be soldered to the 1-2 elastic member (612). Thus, the second wire (632) may be electrically connected to the 1-2 elastic member (612). A lower end of second wire (632) may be soldered to the second substrate (720). Hence, the second wire (632) may be electrically connected to the second substrate (720). The second wire (632) may electrically connect the 1-2 elastic member (612) with the second substrate (720).

The third wire (633) may be downwardly extended from an upper side (upper surface) of third corner of housing (400). In this case, the third wire (633) may pass through a first substrate (710) through a third through hole (718). An upper end of third wire (633) may be soldered to the 1-3 elastic member (613). Thus, the third wire (633) may be electrically connected to the 1-2 elastic member (613). A lower end of third wire (633) may be soldered to the second substrate (720). Hence, the third wire (633) may be electrically connected to the second substrate (720). The third wire (633) may electrically connect the 1-3 elastic member (613) with the second substrate (720).

The fourth wire (634) may be downwardly extended from an upper side (upper surface) of fourth corner of housing (400). In this case, the fourth wire (634) may pass through a first substrate (710) through a fourth through hole (719). An upper end of fourth wire (634) may be soldered to the 1-4 elastic member (614). Thus, the fourth wire (634) may be electrically connected to the 1-4 elastic member (614). A lower end of fourth wire (634) may be soldered to the second substrate (720). Hence, the fourth wire (634) may be electrically connected to the second substrate (720). The fourth wire (634) may electrically connect the 1-4 elastic member (614) with the second substrate (720).

The substrate (700) may be a PCB (Printed Circuit Board). The substrate (700) may be disposed inside of cover (100). The substrate (700) may take a plate shape centrally formed with a hole. The substrate (700) may be disposed underneath the housing (400). The substrate (700) may be disposed above the base (800). The substrate (700) may be electrically connected to a main substrate of camera module. The substrate (700) may be supplied with a power or flown with an electronic signal controlled by the main substrate of camera module. The substrate (700) may be electrically connected to the third elastic member (630). The power or electronic signal outputted from the substrate (700) may be transmitted to the first sensor (930) through the third elastic member (630), and may be transmitted to the first coil (300) from the first sensor (930) through the second elastic member (620). A position information electronic signal of bobbin (200) outputted from the first sensor (930) may be transmitted to the substrate (700) through the third elastic member (630). An upper surface of substrate (700) may be disposed with a second coil (900). The second coil (900) may be mounted on the substrate (700). The power or the electronic signal outputted from the substrate (700) may be transmitted to the second coil (900). A lower surface of substrate (700) may be disposed with a second sensor (940). The second sensor (940) may be mounted on the substrate (700). A position information electronic signal outputted from the second sensor (940) may be transmitted to the substrate (700).

The substrate (700) may transmit the power or the electronic signal controlled by the main substrate to the first coil (300). As a result, the AF function of the bobbin (200) being moved to an optical axis direction can be implemented. Furthermore, the substrate (700) may transmit the power or the electronic signal controlled by the main substrate to the second coil (900). As a result, the OIS function of the housing (400) being moved or tilted to a direction perpendicular to an optical axis may be implemented. Furthermore, the substrate (700) may receive the position information signal of bobbin (200) and the housing (400) outputted from the first sensor (930) and the second sensor (940) may be transmitted to the main substrate by being transmitted of the position information signal. Thus, the main substrate may control (feedback control) a power (current) applied to the first coil (300) and the second coil (900) in response to the positions of bobbin (200) and the housing (400). As a result, a more accurate AF function and OIS function can be implemented.

An upper width of the substrate (700) may be greater at least for some portions than a lower width of the substrate (700). As a result, a lower surface of an upper edge of substrate (700) may be exposed to an outside. In this case, the exposed upper edge of substrate (700) may face a protrusion (820) of base (800). The present exemplary embodiment may be characterized by the fact that a lower edge of the substrate (700) is inwardly escaped, and an escape space of substrate (700) is made to be inserted by the protrusion (820) of base (800). As a result, the base (800) can additionally obtain a sealing area contacted by a plurality of lateral plates (120, 130, 140, 150) of cover (100) as much as an area where the protrusion (820) is protruded.

The substrate (700) may comprise a first substrate (710) and a second substrate (720). The first substrate (710) and the second substrate (720) may be a PCB (Printed Circuit Board) or an FPCB (Flexible Printed Circuit Board). The first substrate (710) may be disposed or formed with a second coil (900) and the second substrate (720) may be formed with a circuit, and may be electrically connected to a main substrate of camera module. The reason of dividing the substrate (700) to a first substrate (710) and a second substrate (720) is to obtain a broader mounting area of second coil (900) by dividing the second coil (900) from other essential driving circuits. However, the present invention is not limited thereto, and the first substrate (710) and the second substrate (720) may be integrally formed.

The first substrate (710) may be disposed above the second substrate (720). The first substrate (710) and the second substrate (720) may be electrically connected. A lower surface of first substrate (710) and an upper surface of second substrate (720) may be brought into contact. The first substrate (710) and the second substrate (720) may be coupled by being mutually adhered or soldered. In this case, a conductive adhesive may be used as an adhesive.

A width of the first substrate (710) may be greater at least for some portion thereof than that of the second substrate to allow a lower edge surface of the first substrate (710) to be exposed to outside. That is, a lower surface of first substrate (710) may be exposed from the second substrate (720). In this case, a lower edgy surface of the exposed first substrate (710) may vertically face an upper surface of the protrusion (820) of the base (800) for at least some portion thereof.

The present exemplary embodiment, as noted above, may be characterized by the fact that an edge of the second substrate (720) is inwardly escaped, and an escape space of the second substrate (720) is made to be inserted by the protrusion (820) of base (800). As a result, the base (800) can additionally obtain a sealing area contacted by a plurality of lateral plates (120, 130, 140, 150) of cover (100) as much as a protruded area by the protrusion (820)

The first substrate (710) may comprise a hole (711), a first edge (712), a second edge (713), a third edge (714), a fourth edge (715), a first through hole (716), a second through hole (717), a third through hole (718) and a fourth through hole (719). The hole (711) of the first substrate (710) may be centrally formed at the first substrate (710). This is to provide a path for a light having penetrated a lens module (1) to pass thereby. The first, second, third and fourth edges (712, 713, 714, 715) may be an external portion (edge, or marginal area) of the first substrate (710). A lower surface of the first, second, third and fourth edges (712, 713, 714, 715) may be exposed to outside without being overlapped with the second substrate (720).

The first edge (712) may be so disposed as to face the first lateral plate (120) of first cover (100). The second edge (713) may be so disposed as to face the second lateral plate (130) of first cover (100). The third edge (714) may be so disposed as to face the third lateral plate (140) of first cover (100). The fourth edge (715) may be so disposed as to face the fourth lateral plate (150) of first cover (100).

A 2-1 coil (901) may be disposed (mounted) between the first edge (712) and a hole (711) of first substrate (710). A 2-2 coil (902) may be disposed (mounted) between the second edge (713) and a hole (711) of first substrate (710). A 2-3 coil (903) may be disposed (mounted) between the third edge (714) and a hole (711) of first substrate (710). A 2-4 coil (904) may be disposed (mounted) between the fourth edge (715) and a hole (711) of first substrate (710).

A first protrusion (811) may be disposed underneath the first edge (712). A second protrusion (812) may be disposed underneath the second edge (713). A third protrusion (813) may be disposed underneath the third edge (714). A fourth protrusion (814) may be disposed underneath the fourth edge (715).

A first through hole (716) may be formed at a corner between the first edge (712) and the third edge (714). The first through hole (716) may be disposed with a first wire (631). The first wire (631) may be connected to the second substrate (720) through the first through hole (716).

A second through hole (717) may be formed at a corner between the second edge (713) and the fourth edge (715). The second through hole (717) may be disposed with a second wire (632). The second wire (632) may be connected to the second substrate (720) through the second through hole (717).

A third through hole (718) may be formed at a corner between the first edge (712) and the fourth edge (715). The third through hole (718) may be disposed with a third wire (633). The third wire (633) may be connected to the second substrate (720) through the third through hole (718).

A fourth through hole (719) may be formed at a corner between the second edge (713) and the third edge (714). The fourth through hole (719) may be disposed with a fourth wire (634). The fourth wire (634) may be connected to the second substrate (720) through the fourth through hole (719).

The second substrate (720) may comprise a hole (721), a first connection substrate (722) and a second connection substrate (723). The second substrate (720) may take a square plate shape. The second substrate (720) may be centrally formed with a hole (721). The first connection substrate (722) may be downwardly extended from an edge (side) of one side of the second substrate (720). The second connection substrate (723) may be downwardly extended from the other side of an edge (side) of the second substrate (720). Each of the first connection substrate (722) and the second connection substrate (723) may be an FPCB (Flexible Printed Circuit Board). The first connection substrate (722) may be extended to a first lateral surface (811) of base (800). The first connection substrate (722) may be accommodated into a first reception part (861) at the first lateral surface (811) of base (800). The second connection substrate (723) may be extended to a second lateral surface of base (800). The second connection substrate (723) may be accommodated into a second reception part (871) at a second lateral surface of base (800). The first connection substrate (722) and the second connection substrate (723) may be electrically connected to a main substrate of camera module. The second substrate (720) may be mounted with a second sensor (940). In this case, the second sensor (940) may be disposed at a lower surface of second substrate (720) to be accommodated into a second sensor reception part (880) of base (800).

The base (800) may be disposed underneath the cover (100). The base (800) may be coupled with the cover (100). The base (800) may be coupled with the cover (100) using an adhesive. A substrate (700) may be disposed above the base (800).

The base (800) may comprise a body (810), a first lateral surface (811), a second lateral surface (not shown), a third lateral surface (813), a fourth lateral surface (not shown), a protrusion (820), a support part (830), a fence (840), a guide lug (850), a first reception part (861), a second reception part (871) and a second sensor reception part (880).

The body (810) of base (800) may take a square plated shape centrally formed with a hole (801). An upper surface of body (810) of base (800) may be disposed with the second substrate (720). An edge of the body (810) of base (800) may be disposed with a protrusion (820). An external surface of body (810) of base (800) may be disposed with a staircase (830) protruded to an outside. An upper surface of body (810) of base (800) may be disposed with a fence (840) formed in a ring shape along the hole (801). An upper surface of body (810) of base (800) may be disposed with a guide lug (850) protruded from an outside of the fence (840). An external surface of body (810) of base (800) may be disposed with a first reception part (861) and a second reception part (871) each inwardly recessed. An upper surface of body (810) of base (800) may be disposed with an inwardly recessed second reception part (880).

A first lateral surface (811), a second lateral surface, a third lateral surface (813) and a fourth lateral surface may be an external surface of body (810) of base (800). That is, the first lateral surface (811), the second lateral surface, the third lateral surface (813) and the fourth lateral surface may be surfaces disposed on an external surface of body (810) of base (800). The first lateral surface (811) may be disposed at an opposite side of second lateral surface (vice versa). The third lateral surface (813) may be disposed at an opposite side of fourth lateral surface (vice versa). The first lateral surface (811) may be so disposed as to face the first lateral plate (120) of cover (100), the second lateral surface may be so disposed as to face the second lateral plate (130) of cover (100), the third lateral surface may be so disposed as to face the third lateral plate (140) of cover (100), and the fourth lateral surface may be so disposed as to face the fourth lateral plate (150) of cover (100).

The protrusion (820) may upwardly protrude from an upper surface of body (800) at the base (800). An external surface of protrusion (820) may be formed by allowing an external surface of body (810) at the base to be upwardly extended. That is, the external surface of protrusion (820) may form a plane with the external surface of body (810) at the base (800).

The external surface of protrusion (820) may face internal surfaces of a plurality of lateral plates (120, 130, 140, 150) of cover (100). The external surface of protrusion (820) may be brought into contact with the plurality of lateral plates (120, 130, 140, 150) of cover (100). An adhesive may be interposed between the external surface of protrusion (820) and the plurality of lateral plates (120, 130, 140, 150) of cover (100).

An internal surface of protrusion (820) may face an external surface of a lower portion (second substrate, 720) of substrate (700). The internal surface of protrusion (820) may be brought into contact with an external surface of a lower portion (second substrate, 720) of substrate (700). An adhesive may be interposed between the internal surface of protrusion (820) and an external surface of lower portion (second substrate, 720) of substrate (700).

The protrusion (820) may be disposed underneath an upper portion (first substrate, 710) of substrate (700). An upper surface of protrusion (820) may face a lower surface of upper portion (first substrate, 710) of substrate (700). The upper surface of protrusion (820) may be brought into contact with a lower surface of upper portion (first substrate, 710) of substrate (700). An adhesive may be interposed between the upper surface of protrusion (820) and a lower surface of an upper portion (first substrate, 710) of substrate (700). The upper surface of protrusion (820) may be disposed at a same height as or lower than a lower surface of upper portion (first substrate, 710) of substrate.

Height of protrusion (820) may take a variety of shapes. For example, the height of protrusion (820) may be the same as or higher than an upper surface of upper portion (first substrate, 710) of substrate, and may be lower than or same as the upper surface of lower portion (second substrate, 720) of substrate (700). That is, the upper surface of protrusion (820) may be disposed on a same position as or at a lower position than an upper surface of upper portion (first substrate, 710) of substrate (700). A length (height of protrusion) between an upper surface of protrusion (820) and an upper surface of body (810) of base may be same as or smaller than a length between an upper surface of the upper portion (first substrate, 710) of substrate (700) and a lower surface of lower portion (second substrate, 720) of the substrate (700).

An upper surface of protrusion (820) may be same as or lower than a height of an upper surface of lower portion (second substrate, 720) of substrate. The upper surface of protrusion (820) may be disposed at a position same as or lower than a position of lower surface of upper portion (first substrate, 710) of substrate (700).

That is, in the present exemplary embodiment, as seen in FIG. 11, a height of the protrusion (820) may be located to be in the same position as or in a lower position than an upper surface of lower surface (second substrate, 720) of substrate (700). In a modification of the present exemplary embodiment, as shown in FIG. 12, the height of protrusion (820) may be disposed at a same position as or at a lower position than an upper surface of upper side (first substrate, 710) of substrate (700).

As illustrated in FIG. 11, when the height of protrusion (820) is located to be in the same position as or in a lower position than an upper surface of lower surface (second substrate, 720) of substrate (700), there is no change in an area of the upper surface (first substrate, 710) of substrate (700) to thereby enable to obtain a broader mounting area of the second coil (900).

As shown in FIG. 12, when the height of protrusion is disposed at a same position as or at a lower position than an upper surface of upper side (first substrate, 710) of substrate (700), although an area of the upper surface (first substrate, 710) of substrate (700) must be reduced, the height of protrusion (820) is made to be formed higher to obtain a broader sealing area between the cover (100) and the protrusion (820). In this case, an inner lateral surface of protrusion (820) may face an outer lateral surface of upper surface (first substrate, 710) of substrate (700).

The height of protrusion (820) may be more than 0.1 mm but less than 0.5 mm. That is, a length (shortest length) from an upper surface of body (810) of base (800) to an upper surface of protrusion (820) may be more than 0.1 mm but less than 0.5 mm. If the height of protrusion (820) is less than 0.1 mm, there is no way of securing a broader sealing between the cover (100) and the protrusion (820) and therefore, it is not preferable. Furthermore, when the height of protrusion (820) is more than 0.5 mm, an area of substrate (800) must be reduced in order to arrange the protrusion and therefore, it is not preferable.

The height of protrusion (820) may be more than 80% of the thickness of lower surface (second substrate, 720) of substrate (700). That is, a length (shortest length) from an upper surface of body (810) of base (800) to an upper surface of protrusion (820) may be more than 80% of thickness of lower surface (second substrate, 720) of substrate (700). If the height of protrusion (820) is less than 80% of thickness of lower surface (second substrate, 720) of substrate (700), there is no way of obtaining a broader sealing area, and therefore it is not preferable.

The protrusion (820) of the present exemplary embodiment, as shown in FIG. 11, may not be overlapped with the upper surface (first substrate, 710) of substrate (700) to a vertical direction. However, the present invention is not limited thereto, and as shown in a second modification of FIG. 13, the protrusion (820) may be overlapped with the upper surface (first substrate, 710) of substrate (700) to a vertical direction.

The protrusion (820) may comprise a first protrusion (821), a second protrusion (822), a third protrusion (823) and a fourth protrusion (824).

The first protrusion (821) may be upwardly protruded from an upper surface of body (810) of base (800). An outer lateral surface of first protrusion (821) may be formed to be upwardly extended from a first lateral surface (811) of body (810) of base (800). That is, an outer lateral surface of first protrusion (821) may form a plane with the first lateral surface (811) of body (810) of base (800).

An outer lateral surface of first protrusion (821) may face an inner lateral surface of first lateral plate (120) of cover (100). The outer lateral surface of first protrusion (821) may be brought into contact with an inner lateral plate (120) of cover (100). An adhesive may be interposed between the outer lateral surface of first protrusion (821) and the first lateral plate (120) of cover (100).

The inner lateral surface of first protrusion (821) may face an outer lateral surface of lower surface (second substrate, 720) of substrate (700). The inner lateral surface of first protrusion (821) may be brought into contact with an outer lateral surface of lower surface (second substrate, 720) of substrate (700). An adhesive may be interposed between an inner lateral surface of first protrusion (821) and an outer lateral surface of lower surface (second substrate, 720) of substrate (700).

The first protrusion (821) may be disposed underneath the first edge (712) of upper surface (first substrate, 710) of substrate (700). An upper surface of first protrusion (821) may face a lower surface of first edge (712) of upper surface (first substrate, 710) of substrate (700). An upper surface of first protrusion (821) may be brought into contact with a lower surface of first edge (712) of upper surface (first substrate, 710) of substrate (700). An adhesive may be interposed between an upper surface of first protrusion (821) and a lower surface of first edge (712) of upper surface (first substrate, 710) of substrate (700). An upper surface of first protrusion (821) may be disposed to be in the same height as or to be lower than a lower surface of upper surface (first substrate, 710) of substrate.

The first protrusion (821) may comprise a 1-1 protrusion (821-1) and a 1-2 protrusion (821-2). The 1-1 protrusion (821-1) and the 1-2 protrusion (821-2) may be so disposed as to be mutually spaced apart. A first reception part (861) may be interposed between the 1-1 protrusion (821-1) and the 1-2 protrusion (821-2). The 1-1 protrusion (821-1) may be disposed at one side of the first reception part (861). The 1-2 protrusion (821-2) may be disposed at the other side of first reception part (861).

The second protrusion (822) may be upwardly protruded from an upper surface of body (810) of base (800). An outer lateral surface of second protrusion (822) may be so formed as to be extended upwardly from the second lateral surface of body (810) of base (800). That is, an outer lateral surface of second protrusion (822) may form a plane with the second lateral surface of body (810) of base (800).

An outer lateral surface of second protrusion (822) may face an inner lateral surface of second lateral plate (130) of cover (100). The outer lateral surface of second protrusion (822) may be brought into contact with an inner lateral surface of second plate (130) of cover (100). An adhesive may be interposed between the outer lateral surface of second protrusion (822) and the second lateral plate (130) of cover (100).

The inner lateral surface of second protrusion (822) may face an outer lateral surface of lower surface (second substrate, 720) of substrate (700). The inner lateral surface of second protrusion (822) may be brought into contact with an outer lateral surface of lower surface (second substrate, 720) of substrate (700). An adhesive may be interposed between an inner lateral surface of second protrusion (822) and an outer lateral surface of lower surface (second substrate, 720) of substrate (700).

The second protrusion (822) may be disposed underneath the second edge (713) of upper surface (first substrate, 710) of substrate (700). An upper surface of second protrusion (822) may face a lower surface of second edge (713) of upper surface (first substrate, 710) of substrate (700). An upper surface of second protrusion (822) may be brought into contact with a lower surface of second edge (713) of upper surface (first substrate, 710) of substrate (700). An adhesive may be interposed between an upper surface of second protrusion (822) and a lower surface of second edge (713) of upper surface (first substrate, 710) of substrate (700). An upper surface of second protrusion (822) may be disposed to be in the same height as or to be lower than a lower surface of upper surface (first substrate, 710) of substrate.

The second protrusion (822) may comprise a 2-1 protrusion (822-1) and a 2-2 protrusion (822-2). The 2-1 protrusion (822-1) and the 2-2 protrusion (822-2) may be so disposed as to be mutually spaced apart. A second reception part (871) may be interposed between the 2-1 protrusion (822-1) and the 2-2 protrusion (822-2). The 2-1 protrusion (822-1) may be disposed at one side of the second reception part (871). The 2-2 protrusion (822-2) may be disposed at the other side of second reception part (871).

The third protrusion (823) may be upwardly protruded from an upper surface of body (810) of base (800). An outer lateral surface of third protrusion (823) may be so formed as to be extended upwardly from the third lateral surface (813) of body (810) of base (800). That is, an outer lateral surface of third protrusion (823) may form a plane with the third lateral surface (813) of body (810) of base (800).

An outer lateral surface of third protrusion (823) may face an inner lateral surface of third lateral plate (140) of cover (100). The outer lateral surface of third protrusion (823) may be brought into contact with an inner lateral surface of third lateral plate (140) of cover (100). An adhesive may be interposed between the outer lateral surface of third protrusion (823) and the third lateral plate (140) of cover (100).

The inner lateral surface of third protrusion (823) may face an outer lateral surface of lower surface (second substrate, 720) of substrate (700). The inner lateral surface of third protrusion (823) may be brought into contact with an outer lateral surface of lower surface (second substrate, 720) of substrate (700). An adhesive may be interposed between an inner lateral surface of third protrusion (823) and an outer lateral surface of lower surface (second substrate, 720) of substrate (700).

The third protrusion (823) may be disposed underneath the third edge (714) of upper surface (first substrate, 710) of substrate (700). An upper surface of third protrusion (823) may face a lower surface of third edge (714) of upper surface (first substrate, 710) of substrate (700). An upper surface of third protrusion (823) may be brought into contact with a lower surface of third edge (714) of upper surface (first substrate, 710) of substrate (700). An adhesive may be interposed between an upper surface of third protrusion (823) and a lower surface of third edge (714) of upper surface (first substrate, 710) of substrate (700). An upper surface of third protrusion (823) may be disposed to be in the same height as or to be lower than a lower surface of upper surface (first substrate, 710) of substrate.

The fourth protrusion (824) may be upwardly protruded from an upper surface of body (810) of base (800). An outer lateral surface of fourth protrusion (824) may be so formed as to be extended upwardly from a fourth lateral surface of body (810) of base (800). That is, an outer lateral surface of fourth protrusion (824) may form a plane with the fourth lateral surface (813) of body (810) of base (800).

An outer lateral surface of fourth protrusion (824) may face an inner lateral surface of fourth lateral plate (150) of cover (100). The outer lateral surface of fourth protrusion (824) may be brought into contact with an inner lateral surface of fourth lateral plate (150) of cover (100). An adhesive may be interposed between the outer lateral surface of fourth protrusion (824) and the fourth lateral plate (150) of cover (100).

The inner lateral surface of fourth protrusion (824) may face an outer lateral surface of lower surface (second substrate, 720) of substrate (700). The inner lateral surface of fourth protrusion (824) may be brought into contact with an outer lateral surface of lower surface (second substrate, 720) of substrate (700). An adhesive may be interposed between an inner lateral surface of fourth protrusion (824) and an outer lateral surface of lower surface (second substrate, 720) of substrate (700).

The fourth protrusion (824) may be disposed underneath the fourth edge (715) of upper surface (first substrate, 710) of substrate (700). An upper surface of fourth protrusion (824) may face a lower surface of fourth edge (715) of upper surface (first substrate, 710) of substrate (700). An upper surface of fourth protrusion (824) may be brought into contact with a lower surface of fourth edge (715) of upper surface (first substrate, 710) of substrate (700). An adhesive may be interposed between an upper surface of fourth protrusion (824) and a lower surface of fourth edge (715) of upper surface (first substrate, 710) of substrate (700). An upper surface of fourth protrusion (824) may be so disposed as to be in the same height as or to be lower than a lower surface of upper surface (first substrate, 710) of substrate.

In the present exemplary embodiment, an edge of lower surface (second substrate, 720) of substrate (700) is escaped, a protrusion (820) is disposed at an escaped space of edge of the lower surface (second substrate, 720) of substrate (700), and an adhesive is disposed between an outer lateral surface of protrusion (820) and the plurality of lateral plates (120, 130, 140, 150) of cover (100) to thereby increase a sealing area. Furthermore, an inner lateral surface of protrusion (820) and an outer lateral surface of lower surface (second substrate, 720) of substrate (700) may be faced or contacted to allow guiding the substrate (700) along with the guide lug (850).

The staircase (830) may be formed by being outwardly protruded from an outer lateral surface of body (810) of base (800). That is, the outer lateral surface of body (810) of base (800) may be formed with a staircase (830). The staircase (830) may support the cover (100). An upper surface of staircase (830) may face a lower surface of a plurality of lateral plates (120, 130, 140, 150) of cover (100). The upper surface of staircase (830) may be disposed with a lower surface of the plurality of lateral plates (120, 130, 140, 150) of cover (100). A width of upper surface of staircase (830) may be same as or greater than a thickness of the plurality of lateral plates (120, 130, 140, 150) of cover (100). The upper surface of staircase (830) may be brought into contact with a lower surface of the plurality of lateral plates (120, 130, 140, 150) of cover (100). An adhesive may be interposed between the upper surface of staircase (830) and a lower surface of the plurality of lateral plates (120, 130, 140, 150) of cover (100).

The staircase (830) may comprise a first staircase, a second staircase, a third staircase and a fourth staircase. In this case, each of the first staircase, the second staircase, the third staircase and the fourth staircase may be formed in a plural number. For example, each of the first staircase, the second staircase, the third staircase and the fourth staircase may be formed in the number of two. That is, the first staircase may comprise a 1-1 staircase (831-1) and a 1-2 staircase (831-2). The second staircase may comprise a 2-1 staircase (832-1) and a 2-2 staircase (832-2). The third staircase may comprise a 3-1 staircase (833-1) and a 3-2 staircase (833-2). The fourth staircase may comprise 4-1 staircase (834-1) and a 4-2 staircase (834-2).

The 1-1 staircase (831-1) and the 1-2 staircase (831-2) may be mutually spaced apart. The 1-1 staircase (831-1) and the 1-2 staircase (831-2) may be outwardly protruded from a first lateral surface (811) of body (810) of base (800). An upper surface of the 1-1 staircase (831-1) and the 1-2 staircase (831-2) may face or contact a lower surface of first lateral plate (120) of cover (100). An adhesive may be interposed between an upper surface of the 1-1 staircase (831-1) and the 1-2 staircase (831-2) and a lower surface of first lateral plate (120) of cover (100). A first reception part (861) may be disposed between the 1-1 staircase (831-1) and the 1-2 staircase (831-2).

The 2-1 staircase (832-1) and the 2-2 staircase (832-2) may be mutually spaced apart. The 2-1 staircase (832-1) and the 2-2 staircase (832-2) may be outwardly protruded from a second lateral surface of body (810) of base (800). An upper surface of the 2-1 staircase (832-1) and the 2-2 staircase (832-2) may face or contact a lower surface of second lateral plate (130) of cover (100). An adhesive may be interposed between an upper surface of the 2-1 staircase (832-1) and the 2-2 staircase (832-2) and a lower surface of second lateral plate (130) of cover (100). A second reception part (871) may be disposed between the 2-1 staircase (832-1) and the 2-2 staircase (832-2).

The 3-1 staircase (833-1) and the 3-2 staircase (833-2) may be mutually spaced apart. The 3-1 staircase (833-1) and the 3-2 staircase (833-2) may be outwardly protruded from a third lateral surface (813) of body (810) of base (800). An upper surface of the 3-1 staircase (833-1) and the 3-2 staircase (833-2) may face or contact a lower surface of third lateral plate (140) of cover (100). An adhesive may be interposed between an upper surface of the 3-1 staircase (833-1) and the 3-2 staircase (833-2) and a lower surface of third lateral plate (140) of cover (100).

The 4-1 staircase (834-1) and the 4-2 staircase (834-2) may be mutually spaced apart. The 4-1 staircase (834-1) and the 4-2 staircase (834-2) may be outwardly protruded from a fourth lateral surface (814) of body (810) of base (800). An upper surface of the 4-1 staircase (834-1) and the 4-2 staircase (834-2) may face or contact a lower surface of fourth lateral plate (150) of cover (100). An adhesive may be interposed between an upper surface of the 4-1 staircase (834-1) and the 4-2 staircase (834-2) and a lower surface of fourth lateral plate (150) of cover (100).

The fence (840) may be upwardly protruded from an upper surface of base (800). The fence (840) may take a ring shape along a hole (801) of base (800). The fence (840) may be disposed on holes (711, 721) of substrate (700). The fence (840) may take a shape corresponding to that of the holes (711, 721) of substrate (700).

The guide lug (850) may guide the substrate (700). The guide lug (850) may be upwardly protruded from an upper surface of body (810) of base (800). The guide lug (850) may be outwardly protruded from an outer circumferential surface of fence (840). The guide lug (850) may be disposed on a guide groove (outwardly formed from an inner circumferential surface of substrate) disposed on the holes (711, 721) of substrate (700). The guide lug (850) may be formed in the number of three. The said three guide lugs (850) may be mutually spaced apart along an outer circumferential surface of fence (840).

An external side of substrate (700) in the present exemplary embodiment may be disposed with a protrusion (820), and an inside of substrate (700) may be disposed with a fence (840) and a guide lug (850) to enable to more accurately guide the substrate (700) and to stably fix the substrate (700).

The first reception part (861) may be formed by allowing a first lateral surface (811) of body (810) of base (800) to be inwardly recessed. The first reception part (861) may be downwardly extended from the first lateral surface (811) of body (810) of base (800). That is, a lower surface of first reception part (861) may be located to be lower than a lower surface of body (810) of base (800). The first reception part (861) may be disposed with a first connection substrate (722) of second substrate (720). The first connection substrate (722) may be stably supported by the first reception part (861).

The second reception part (871) may be formed by allowing a second lateral surface of body (810) of base (800) to be inwardly recessed. The second reception part (871) may be downwardly extended from the second lateral surface of body (810) of base (800). That is, a lower surface of second reception part (871) may be located to be lower than a lower surface of body (810) of base (800). The second reception part (871) may be disposed with a second connection substrate (723) of second substrate (720). The second connection substrate (723) may be stably supported by the second reception part (871).

The second sensor reception part (870) may be formed by allowing an upper surface of body (810) of base (800) to be downwardly recessed. The second sensor reception part (870) may be disposed with a second sensor (940).

The abovementioned base (800) is an example of the present exemplary embodiment, and the structure of the base (800) according to the present exemplary embodiment is not limited thereto. The base (800) according to the present exemplary embodiment may be changed in various shapes.

For example, some of the plurality of protrusions (820) and some of the plurality of staircases (830) may be omitted. That is, the protrusion (820) and the staircase (830) may be formed only on some of the first lateral surface (811), the second lateral surface (813) and the fourth lateral surface of body (810) of base (800).

Furthermore, because at least one of the first and second connection substrates (722, 723) of second substrate (720) is omitted, at least one of the first and second reception parts (861, 871) of base (800) may be also omitted.

Furthermore, each of the first protrusion (821), the second protrusion (822), the third protrusion (823) and the fourth protrusion (824) may exist as one single member or may exist as a plurality of members each mutually spaced apart. For example, the 1-1 protrusion (821-1) and the 1-2 protrusion (821-2) may be mutually connected to allow the first protrusion (821) to exist as a single member, and the third protrusion (823) may exist as three members each mutually spaced apart. This type of arrangement and shape of protrusion (820) may be applied mutatis mutandis to the staircase (830).

The second coil (900) may be a pattern coil formed on an upper surface (first substrate) of substrate. The second coil (900) may be so disposed as to face the magnet (500). The second coil (900) may comprise a 2-1 coil (901), a 2-2 coil (902), a 2-3 coil (903) and a 2-4 coil (904). The 2-1 coil (901) may be so disposed as to face the first magnet (510). The 2-2 coil (902) may be so disposed as to face the second magnet (520). The 2-3 coil (903) may be so disposed as to face the third magnet (530). The 2-4 coil (904) may be so disposed as to face the fourth magnet (540). A driving force of housing (400) may be generated by the electromagnetic interaction between the second coil (900) and the magnet (500).

The sensing magnet (910) may be disposed on the bobbin (200). The sensing magnet (910) may be disposed on the first coil (300). The sensing magnet (910) may be disposed on the first pocket (230). The sensing magnet (910) may be so disposed as to face the first sensor (930). The magnetic force of sensing magnet (910) may be detected by the first sensor (930) to allow outputting position information of bobbin (200).

The compensation magnet (920) may be disposed on the bobbin (200). The compensation magnet (920) may be disposed on the first coil (300). The compensation magnet (920) may be so disposed as to be at an opposite side of sensing magnet (910). The compensation magnet (920) may be a magnet for compensating the imbalance in masses and magnetic force lines caused by the sensing magnet (910).

The first sensor (930) may be disposed on the housing (400). The first sensor (930) may be a Hall sensor. The first sensor (930) may be so disposed as to face the sensing magnet (910). The first sensor (930) may detect a magnetic force of sensing magnet (910), whereby position information of bobbin (200) may be outputted.

The first sensor (930) may comprise a sensor part (931) and a sensor substrate (932). The sensor part (931) may be disposed with an IC circuit and a Hall sensor for applying a power (a current) to the first coil (300). The current outputted from the sensor part (931) may be transmitted to the first coil (300) through the second elastic member (620). The sensor part (931) may detect a magnetic force of sensing magnet (910), whereby position information of bobbin (200) may be outputted.

One lateral surface (surface facing the first coil) of sensor substrate (932) may be mounted with a sensor part (931). The other lateral surface of sensor substrate (932) may be disposed with a first sensor terminal (932-1), a second sensor terminal (932-2), a third sensor terminal (932-3) and a fourth sensor terminal (932-4). A lower surface of sensor substrate (932) may be disposed with a fifth sensor terminal (932-5) and a sixth sensor terminal (932-6). The first sensor terminal (932-1), the second sensor terminal (932-2), the third sensor terminal (932-3) and the fourth sensor terminal (932-4) may be terminals for transmission of entire power, electronic driving and communication signal. The fifth sensor terminal (932-5) and a sixth sensor terminal (932-6) may be terminals for transmission of driving current by being electrically connected to the first coil (300).

The second sensor (940) may be mounted on a lower surface (second substrate, 720) of substrate (700). The second sensor (940) may be mounted on a lower surface of second substrate (720). The second sensor (940) may be accommodated into the second sensor reception part (880) of base (800). The second sensor (940) may be a Hall sensor. The second sensor (940) may detect a magnetic force of magnet (500), whereby position information of housing (400) may be outputted.

Although the present disclosure has been explained with all constituent elements forming the exemplary embodiments of the present disclosure being combined in one embodiment, or being operated in one embodiment, the present disclosure is not limited thereto. That is, all elements may operate by allowing one or more elements to be selectively combined as long as within the scope of object of the invention. Furthermore, terms such as "comprises", "comprising", "have", "having", "comprises" and/or "comprising" as used herein mean that the relevant elements are embedded, unless otherwise described, such that the mentioned elements are not excluded but may be further comprised.

Unless otherwise defined, all terms comprising technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The foregoing explanations are intended only to be illustrative of the technical ideas of the present invention, and therefore, it should be appreciated by the skilled in the art that various modifications and amendments to the above examples may be made without deviating from the scope of protection of the invention. The exemplary embodiments disclosed by the present invention are not to limit the technical ideas of the present invention but to explain the present invention, and therefore, the technical ideas of present invention are not to be limited by the exemplary embodiments. The scope of protection of the present invention should be interpreted by the following claims and all technical ideas within the equivalent scope should be interpreted as being comprised in the scope of right of the present invention.

The invention claimed is:

1. A lens driving device comprising:
a cover comprising an upper plate and a lateral plate extending from the upper plate;
a housing disposed in the cover;
a bobbin disposed in the housing;
a magnet disposed on the housing;
a first coil disposed on the bobbin and facing the magnet;
a first substrate disposed below the housing and comprising a second coil facing the magnet;
a second substrate disposed below the first substrate; and
a base disposed below the second substrate,
wherein the base comprises a first lateral surface, a second lateral surface disposed opposite to the first lateral surface, and third and fourth lateral surfaces connecting the first lateral surface and the second lateral surface,
wherein the base comprises a body and a plurality of protrusions upwardly protruding from the body,
wherein the plurality of protrusions comprises: a first protrusion upwardly extending from an edge of the first lateral surface of the base; a second protrusion upwardly extending from an edge of the second lateral surface of the base; a third protrusion upwardly extending from an edge of the third lateral surface of the base; a fourth protrusion upwardly extending from an edge of the fourth lateral surface of the base; a fifth protrusion upwardly extending from the edge of the first lateral surface of the base and spaced apart from the first protrusion, the second protrusion, the third protrusion, and the fourth protrusion; and a sixth protrusion upwardly extending from the edge of the second lateral surface of the base and spaced apart from the first protrusion, the second protrusion, the third protrusion, the fourth protrusion, and the fifth protrusion,
wherein an outer lateral surface of the second substrate faces an inner lateral surface of each protrusion of the plurality of protrusions,
wherein an upper surface of each protrusion of the plurality of protrusions is disposed at a position same as or lower than that of an upper surface of the first substrate,
wherein the base comprises a plurality of staircases formed on the first to fourth lateral surfaces of the base,
wherein the lateral plate of the cover is overlapped with the plurality of staircases of the base in an optical axis direction,
wherein the plurality of staircases comprises a first staircase formed on the first lateral surface of the base and disposed at a position corresponding to the first protrusion, a second staircase formed on the first lateral surface of the base and disposed at a position corresponding to the fifth protrusion, a third staircase formed on the third lateral surface of the base, and a fourth staircase formed on the third lateral surface of the base,
wherein the third staircase is disposed at a position corresponding to one end of the third protrusion,
wherein the fourth staircase is disposed at a position corresponding to an other end of the third protrusion, and
wherein the third staircase is spaced apart from the fourth staircase.

2. The lens driving device of claim 1, wherein a distance between the upper surface of each protrusion of the plurality of protrusions and an upper surface of the body of the base is same as or shorter than a distance from the upper surface of the first substrate to a lower surface of the second substrate.

3. The lens driving device of claim 1, wherein the upper surface of each protrusion of the plurality of protrusions is overlapped with an upper surface of the second substrate in a horizontal direction.

4. The lens driving device of claim 1,
wherein an outer lateral surface of each protrusion of the plurality of protrusions faces an inner lateral surface of the lateral plate of the cover, and
wherein an adhesive is disposed between the outer lateral surface of each protrusion of the plurality of protrusions and the lateral plate of the cover.

5. The lens driving device of claim 4, wherein an outer lateral surface of the base faces an inner lateral surface of the lateral plate of the cover.

6. The lens driving device of claim 4,
wherein a lower surface of the lateral plate of the cover is disposed on an upper surface of the plurality of staircases.

7. The lens driving device of claim 6, wherein a width of the upper surface of each staircase of the plurality of staircases is same as or greater than a thickness of the lateral plate of the cover.

8. The lens driving device of claim 1, wherein an outer lateral surface of each protrusion of the plurality of protrusions is overlapped with an outer lateral surface of the base in a vertical direction.

9. The lens driving device of claim 1, wherein the upper surface of each protrusion of the plurality of protrusions is disposed at a position same as or lower than that of a lower surface of the first substrate.

10. The lens driving device of claim 1, wherein the upper surface of each protrusion of the plurality of protrusions faces a lower surface of the first substrate.

11. The lens driving device of claim 1, wherein an adhesive is interposed between the inner lateral surface of each protrusion of the plurality of protrusions and the outer lateral surface of the second substrate.

12. The lens driving device of claim 1, wherein the second substrate comprises a first and second connection substrates downwardly extending from a lateral surface,
wherein the first connection substrate faces the first lateral surface of the base, and
wherein the second connection substrate faces the second lateral surface of the base.

13. The lens driving device of claim 12, wherein the first lateral surface of the base comprises a first reception part disposed with the first connection substrate, and
wherein the second lateral surface of the base comprises a second reception part disposed with the second connection substrate.

14. The lens driving device of claim 1, wherein the lateral plate of the cover comprises an upper plate and a first lateral plate downwardly extending from the upper plate,
wherein the first staircase is configured to support the first lateral plate,
wherein an inner lateral surface of the first lateral plate faces the first lateral surface and an outer lateral surface of the first protrusion, and wherein an adhesive is disposed between the inner lateral surface of the first lateral plate and the first lateral surface, and between the inner lateral plate and the outer lateral surface of the first protrusion.

15. The lens driving device of claim 1, wherein a lateral surface of the first substrate protrudes from a lateral surface of the second substrate,
wherein an upper surface of each protrusion of the plurality of protrusions faces a lower surface of the first substrate,
wherein an outer lateral surface of each protrusion of the plurality of protrusions faces the cover, and
wherein an inner lateral surface of each protrusion of the plurality of protrusions faces a lateral surface of the second substrate.

16. A camera module comprising:
a main substrate;
an image sensor disposed on the main substrate;
the lens driving device of claim 1 disposed on the main substrate; and
a lens coupled to the bobbin.

17. The lens driving device of claim 16, comprising:
an upper elastic member connecting the housing and the bobbin; and
a wire electronically connecting the upper elastic member and the second substrate,
wherein the second substrate comprises a hole formed on a corner area of the second substrate,
wherein the wire passes through the hole of the second substrate, and
wherein the first substrate comprises a first groove recessed from a corner edge of the first substrate and disposed at a position corresponding to that of the hole of the second substrate.

18. The lens driving device of claim 1, comprising:
an upper elastic member connecting the housing and the bobbin; and
a wire electronically connecting the upper elastic member and the second substrate,
wherein the second substrate comprises a hole formed on a corner area of the second substrate,
wherein the wire passes through the hole of the second substrate, and
wherein the first substrate comprises a first groove recessed from a corner edge of the first substrate and disposed at a position corresponding to that of the hole of the second substrate.

19. The lens driving device of claim 1, wherein the base comprises a first and second grooves formed on an upper surface of the base and spaced apart from each other,
wherein the first groove is connected to the third protrusion and the fourth protrusion, and
wherein the second groove is spaced apart from each of the first to sixth protrusions.

20. The lens driving device of claim 1, comprising:
a sensing magnet disposed on the bobbin;
a compensation magnet disposed on the bobbin and disposed opposite to the sensing magnet; and
a sensor disposed on the housing and configured to sense the sensing magnet,
wherein the sensor is disposed at a corner area of the housing.

* * * * *